US012650967B1

(12) United States Patent
Rosewell et al.

(10) Patent No.: US 12,650,967 B1
(45) Date of Patent: Jun. 9, 2026

(54) SPACE-EFFICIENT DATA STRUCTURE

(71) Applicant: 51 Degrees Mobile Experts Limited, Reading (GB)

(72) Inventors: James Rosewell, Reading (GB); Benjamin Shillito, Reading (GB)

(73) Assignee: 51 Degrees Mobile Experts Limited, Reading (GB)

( * ) Notice: Subject to any disclaimer, the term of this patent is extended or adjusted under 35 U.S.C. 154(b) by 0 days.

(21) Appl. No.: 19/222,237

(22) Filed: May 29, 2025

(51) Int. Cl.
G06F 16/22 (2019.01)

(52) U.S. Cl.
CPC .............................. G06F 16/2237 (2019.01)

(58) Field of Classification Search
CPC .................................................. G06F 16/2237
USPC ........................................................ 707/741
See application file for complete search history.

(56) References Cited

U.S. PATENT DOCUMENTS

| | | | |
|---|---|---|---|
| 7,249,149 B1 | 7/2007 | Eatherton et al. | |
| 7,627,570 B2 | 12/2009 | Bosloy et al. | |
| 10,425,786 B2 | 9/2019 | Crook et al. | |
| 10,476,785 B2 | 11/2019 | Ren et al. | |
| 11,308,063 B2 | 4/2022 | Sahi et al. | |
| 2012/0110025 A1 * | 5/2012 | Reznik .................. G06F 16/322 | |
| | | | 707/E17.012 |
| 2018/0173738 A1 * | 6/2018 | Lopez-Ortiz ....... G06F 16/2246 | |

FOREIGN PATENT DOCUMENTS

| | | | | |
|---|---|---|---|---|
| CN | 1784678 A | * | 6/2006 | ............. H04L 45/00 |
| CN | 106716412 A | * | 5/2017 | ......... G06F 16/1847 |
| WO | WO2009078028 | | 6/2009 | |
| WO | WO2022250264 | | 12/2022 | |

OTHER PUBLICATIONS

Wikipedia, "Binary Tree", https://en.wikipedia.org/wiki/Binary_tree, retrieved on May 23, 2025, 8 pages.
Wikipedia, "Database index", https://en.wikipedia.org/wiki/Database_index, retrieved on May 23, 2025, 6 pages.
MaxMind, "MaxMind DB File Format Specification", https://github.com/maxmind/MaxMind-DB/blob/main/MaxMind-DB-spec.md, retrieved on May 23, 2025, 13 pages.
Browne et al., "Forest Packing: Fast, Parallel Decision Forests", arXiv.org, Jun. 19, 2018, 9 pages.

(Continued)

*Primary Examiner* — Giovanna B Colan
(74) *Attorney, Agent, or Firm* — Dority & Manning, P.A.

(57) ABSTRACT

A data structure includes an array having at least a first element, a second element and a third element. The first element represents a first bit of a first entry and a first bit of a second entry, wherein the first bit of the first entry is at the same position as, but has a different value from, the first bit of the entry. The first element stores a reference to only the second element. The second element represents a second bit of the first entry, the second bit of the first entry having a position next to the first bit of the first entry. The third element represents a second bit of the second entry, the second bit of the second entry having a position next to the first bit of the second entry. The third element is stored adjacent to the first element in the array.

17 Claims, 7 Drawing Sheets

(56)        References Cited

OTHER PUBLICATIONS

Great Britain Combined Search and Examination Report for corresponding Application No. GB2506025.2, dated Jun. 26, 2025, 8 pages.
Rao et al., "Making B+-trees cache conscious in main memory", Proc. 2000 ACM SIGMOD Conference on Management of Data, ACM Digital Library. Available from https://doi.org/10.1145/342009. 335449, 2000, pp. 475-486.

* cited by examiner

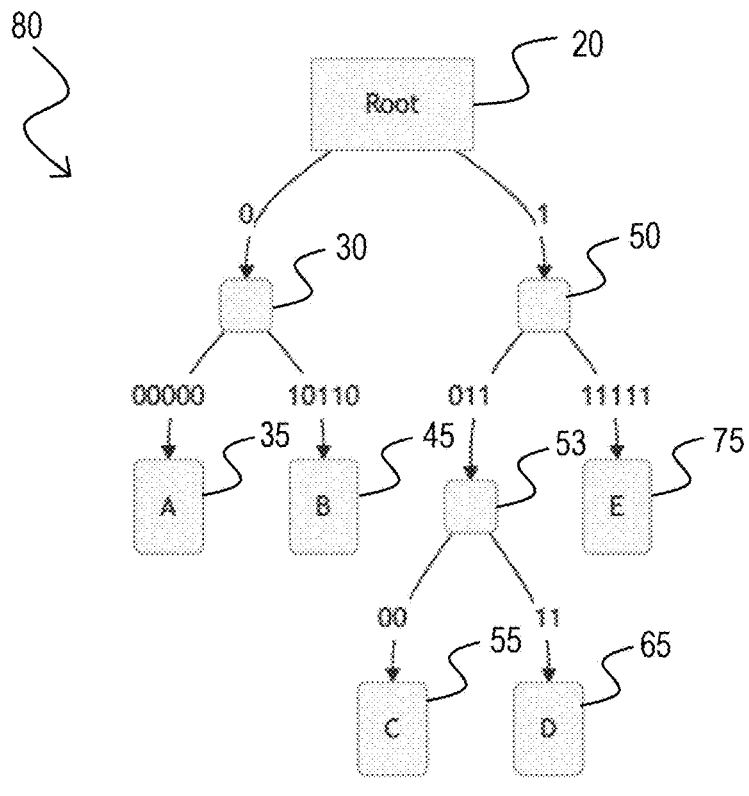
Figure 4
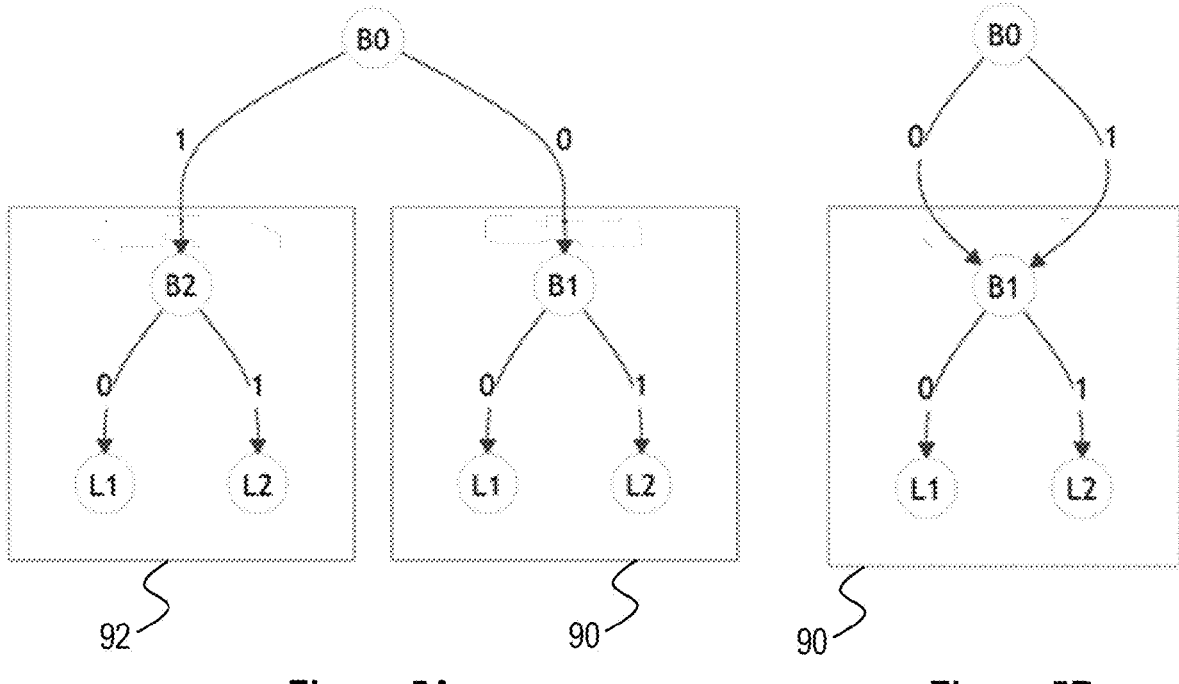
Figure 5A                    Figure 5B

SPACE-EFFICIENT DATA STRUCTURE

This application is based upon and claims the right of priority to GB Patent Application No. 2506025.2, filed on Apr. 23, 2025, the disclosure of which is hereby incorporated by reference herein in its entirety for all purposes.

The present disclosure relates to a data structure in which data can be stored in a space-efficient manner. The present disclosure also relates to methods of creating the structure and retrieving a result from the data structure. Non-limiting examples of data that can be stored in the data structure include Internet Protocol (IP) addresses and geographic locations.

An IP address uniquely identifies a device that can send and/or receive data over a communication network using Internet Protocol. Different versions of Internet Protocol exist, which leads to the existence of different versions of IP addresses. The most common version of IP address is currently IPV4. An IPV4 address is a 32-bit number, mean- ing that over four billion ($2^{32}$) IPv4 addresses are possible (although, in practice, not all these addresses are allocated). A more recent version of IP address is IPV6. An IPv6 address is a 128-bit number, such that a considerably greater number ($2^{128}$) of IPV6 addresses are possible.

There are many situations in which it is desirable to store IP addresses. For example, Internet geolocation allows the real-world location of a computing device to be inferred from the IP address allocated to that computing device. Internet geolocation uses a database that maps IP addresses (or ranges of IP addresses) to their real-world location. In view of the large number of IP addresses that are possible, such a database can occupy a large amount of storage space.

SUMMARY

A first aspect of the invention provides a data structure in which a plurality of entries are stored. Each entry is a binary sequence comprising a plurality of bits, and each bit has a respective position and value. The data structure comprises an array having a plurality of elements including at least a first element, a second element and a third element. The first element represents a first bit of a first entry and a first bit of a second entry, where the first bit of the first entry is at the same position as, but has a different value from, the first bit of the second entry. The first element stores a reference to only the second element. The second element represents a second bit of the first entry, where the second bit of the first entry has a position next to the first bit of the first entry. The third element represents a second bit of the second entry, where the second bit of the second entry has a position next to the first bit of the second entry. The third element is stored adjacent to the first element in the array.

The data structure disclosed herein significantly reduces the amount of space needed to store a given set of binary sequences. When a conventional tree data structure is used to store binary sequences, each parent node stores a refer- ence (e.g., a pointer) to two child nodes: a first child node that defines a path through the tree when a particular bit in a binary sequence has a value of zero; and a second child node that defines a different path through the tree when that particular bit of another binary sequence has a value of one. In contrast, a parent node of the data structure disclosed herein stores a reference (e.g., a pointer) to only one child node (e.g., a child node that defines a path through the tree when a particular bit in a binary sequence has a value of one). The parent node of the data structure disclosed herein is always stored adjacent to the other child node (e.g., a child node that defines a different path through the tree when that particular bit of another binary sequence has a value of zero), which removes the need for the parent node to store a reference to that child node. In comparison to a conven- tional tree data structure, the data structure disclosed herein halves the number of references stored in each parent node.

Throughout the present disclosure, two elements are said to be stored adjacently in the array when the location of one element is at a known offset from the location of the other element. All elements in the data structure have the same size. Hence, the known offset is the same for all adjacent entries in the data structure. Because the offset between the locations of two adjacent elements is known a priori (in other words, the offset is predetermined), there is no need to store a reference from one element to its adjacent element.

For example, if the array is stored in memory, two elements are said to be stored adjacently when the location in memory of one element is at a known offset from the location in memory of the other element. Thus, when the third element is stored adjacent to the first element in the array, the location in memory of the third element can be calculated by adding the known offset to the location in memory of the first element. As another example, if the array is stored as a file in a file system, two elements are said to be stored adjacently when the location within the file of one element is at a known offset from the location within the file of the other element. Thus, when the third element is stored adjacent to the first element in the array, the location within the file of the third element can be calculated by adding the known offset to the location of the first element.

The "first bit" is not necessarily the most significant bit of an entry. Terms such as "first bit" and "second bit" are used to differentiate bits at different positions of an entry, not to define the absolute position of those bits within an entry.

The elements of the array collectively represent the plu- rality of entries.

The data structure disclosed herein can be regarded as a binary tree, i.e., a tree data structure comprising a hierarchy of nodes in which each node has no more than two child nodes. The first node is the parent node of both the second and third elements (or, to put this another way, the second and third elements are child nodes of the first element). The first element may be the root node of the binary tree, in which case the first element represents the most significant bit of each of the plurality of entries stored in the data structure. Alternatively, the first element may be a branch node of the binary tree, in which case the first element represents a bit with a position somewhere between the most and least significant bits of the first and second entries.

The second and third elements may be leaf nodes of the binary tree (i.e., nodes with no child nodes). In this case, the second and third elements represent the least significant bits of the first and second entries, respectively.

Alternatively, the second and third elements may be branch nodes of the binary tree, and may have their own child nodes. In this case, the first and second elements represent a second bit of the first and second entries, respectively, where the second bits have a common position somewhere between the most and least significant bits of the first and second entries. When the second and third elements are branch nodes, they may each have substantially the same form as the first element. For example, the array may further comprise a fourth element and a fifth element. The second element may store a reference to only the fourth element, where the fourth element represents a third bit of the first entry that has a position next to the second bit of the first entry. The fifth element is stored adjacent to the third element in the array and represents a third bit of a third entry. The third bit of the third entry is at the same position as, but has a different value from, the third bit of the first entry. The first and second bits of the third entry are common to the first and second bits of the first entry. Alternatively or in addition, the array may further comprise a sixth element and a seventh element. The third element may store a reference to only the sixth element, where the sixth element represents a third bit of the second entry that has a position next to the second bit of the second entry. The seventh element is stored adjacent to the third element in the array and represents a third bit of a fourth entry. The third bit of the fourth entry is at the same position as, but has a different value from, the third bit of the second entry. The first and second bits of the fourth entry are common to the first and second bits of the second entry. The fourth, fifth, sixth and/or seventh elements may be branch nodes, and their child nodes may be branch nodes, and so on.

The depth of the tree is less than or equal to the number of bits in the longest entry. For example, if the data structure is used to store only IPv4 addresses, which have thirty-two bits, the tree will have a depth of thirty-two or less. if the data structure is also used to store IPv6 addresses, which have one hundred and twenty-eight bits, the tree will have a depth of one hundred and twenty-eight or less.

Optionally, the second element represents one or more least significant bits of the first entry and stores a value that encodes data associated with the first entry, wherein the value is equal to the sum of the data and the number of elements in the array. In this embodiment, the second element is a leaf node of the binary tree discussed above.

An element that encodes data can be distinguished from an element that stores a reference by evaluating whether the value stored in the element is less than the number of elements in the array. More specifically, if the value stored in an element of the array is greater than or equal to the number of elements in the array, that value is assumed to be encoded data. The data can easily be decoded by subtracting the number of elements in the array from the value stored in the respective element of the array. On the other hand, if the value stored in an element of the array is less than the number of elements in the array, that value is a reference to another element of the array. By using the magnitude of a value stored in an element to distinguish encoded data from a reference, each element of the data structure disclosed herein has the same format regardless of whether it stores data associated with an entry or a reference to another entry. This avoids redundancy. Moreover, this allows all elements of the data structure disclosed herein to have the bare minimum size (in bits) needed to represent sum of the total number of elements in the array plus the total number of values associated with the entries stored in the data structure. This can reduce the overall size of the data structure.

Optionally, the third element represents one or more least significant bits of the second entry and stores a value that encodes data associated with the second entry, wherein the value is equal to the sum of the data and the number of elements in the array. In this embodiment, the third element is a leaf node of the binary tree discussed above. The data associated with the second entry is typically different from the data associated with the first entry.

Optionally, the first element stores the reference to the second element as a value that is less than the number of elements in the array. An element that stores a reference is identifiable by the value stored in the element being less than the number of elements in the array. As explained above, this avoids redundancy and allows all elements to have the bare minimum size (in bits), and thereby reduces the size of the data structure.

The form of the reference stored in the first element of the array (and, indeed, any other element of the array) may vary depending how the data structure is implemented. In some implementations, the reference may be the memory address of another element. In other implementations, the reference may be an integer that is multiplied by a known offset to give a location in memory, or a location in a file in a file system, of another element.

Optionally, the first element, second element and/or third element stores a reference to one or more sequences of consecutive bits represented by the first element, second element and/or third element, respectively. These sequences of consecutive bits are referred to herein as "spans". Spans may be used in place of two or more nodes that each have only a single node. Spans thus reduce the number of nodes in the data structure, and thereby reduce the total size of the data structure. Furthermore, when the number of consecutive bits in a span is sufficiently large, fewer bits are needed to store a reference to a span than to store the consecutive bits that constitute the span. This reduces the size of each element, which further reduces the total size of the data structure.

Spans can achieve an even greater reduction in size of the data structure when the same sequence of consecutive bits appears two or more times in different branches of the tree. In this case, an element in each of the different branches can store a reference to the same span. This reduces the number of spans used, which in turn reduces both: (i) the number of bits needed for a "span index" that uniquely identifies each span; and (ii) the size of a look-up table in which the spans are stored.

Optionally, the one or more sequences of consecutive bits represented by one of the first element, second element or third element comprise: a first sequence of consecutive bits representing a lower limit of a range; and a second sequence of consecutive bits representing a higher limit of the range. When a span represents the lower and higher limits of a range, the need to store an entry for each binary sequence in that range can be avoided. Instead, a span represents every binary sequence in a range of consecutive binary sequences, where the range starts at the lower limit and ends at the higher limit. This reduces the size of the data structure by reducing the number of entries that need to be included in the data structure to store a given corpus of data. The range may include the lower limit but exclude the higher limit. In other words, the range may include every binary sequence that is greater than or equal to the lower limit, but less than the higher limit.

Optionally, the second sequence of consecutive bits further represents a lower limit of another range. In this case, the second sequence of consecutive bits has a dual purpose. The second sequence of consecutive bits represents both the higher limit of a first range and the lower limit of a second range. This leads to a reduction in the overall size of the data structure.

Optionally, the reference to one or more sequences of consecutive bits represented by the one of the first element, second element or third element comprises a reference to a row of a look-up table. The row of the look-up table comprises: a first column comprising the first sequence of consecutive bits; and a second column comprising the second sequence of consecutive bits. The look-up table stores the first and second sequences of consecutive bits outside the data structure. This allows the size of each element to be minimised, by avoiding the need to store long sequences of consecutive bits in the elements of the data structure. This can lead to a considerable size reduction in the overall size of the data structure because saving even one byte per element can have significant cumulative effect when a data structure contains thousands, millions or billions of entries.

Any or all of the look-up tables disclosed herein may be distributed with the data structure. For example, a collection of files may be transmitted over a network, where the collection of files comprises the data structure and the look-up table(s). The collection of files may comprise a further table comprising data associated with each entry in the data structure. Alternatively, the look-up table(s) may be concatenated to the beginning or end of the data structure, such that the data structure and look-up table(s) can be stored and distributed as a single file.

Each entry in the data structure may be an IP address. The data structure disclosed herein is particularly useful for storing a set of IP addresses. By reducing the amount of memory needed to store a given set of IP addresses, the data structure disclosed herein can be completely loaded into the random access memory typically allocated to a process by a server computing device. This in turn reduces the time taken to look up an IP address within the data structure by avoiding latency associated with retrieving data from disk. However, it should be appreciated that the data structure can be used to store other types of data, and is not limited to storing IP addresses or any of the other example types of data described herein.

The data associated with the first and/or second entries may identify a geographic location. The data structure disclosed herein can thus be used to store and retrieve a geographic location associated with an IP address in a space-efficient manner. This is useful for performing Internet geolocation, in which the real-world location of a computing device is determined from the computing device's IP address.

In one implementation, the data associated with an IP address may identify the geographic location indirectly. That is, the data associated with an IP address may comprise a reference to an entry in another data structure, where that entry identifies the geographic location. For example, the data associated with an IP address may comprise a reference to a row of a table, where each row in the table stores data indicative of a respective geographic location. Continuing this example, each row in the table may comprise a latitude and/or longitude of a geographic location. Alternatively or in addition, each row in the table may comprise a text string indicating a geographic location, such as a town, city, state and/or country. Referencing an entry in another data structure allows more detailed information on the geographic location than could be stored in the second element of the data structure itself.

In another implementation, the data associated with an address may identify the geographic location directly. For example, the data associated with an IP address may be a two-character country code, such as an ISO 3166-2 alpha-2 country code. Identifying the geographic location in an element of the data structure itself can avoid the need to resolve a reference to an entry in another data structure, which can reduce the time taken to return the geographic location associated with an IP address.

The data structure disclosed herein can be used for storing and retrieving other types of data associated with an IP address. In one example, the data associated with an IP address identifies a destination IP address. The data structure can thus be used to implement a routing table in a space-efficient manner. In another example, the data associated with an IP address comprises an indication of whether to grant or deny a service to that IP address. The data structure can thus be used to implement a blocklist or an allowlist in a space-efficient manner. The blocklist or allowlist can be used, for example, to prevent denial of service attacks or sending of undesired email messages ("spam") from specific email addresses associated with IP addresses.

A further aspect of the invention provides a computer-readable medium having stored thereon a data structure as disclosed herein. The computer-readable medium may be transitory (e.g., a signal) or non-transitory (e.g., a volatile or non-volatile memory, or an optical or magnetic disk). The data structure disclosed herein is space-efficient and, therefore, is also energy-efficient both when used to evaluate IP addresses and when communicated from one computing device to another computing device in the form of a signal (such as an electrical signal, optical signal or electromagnetic signal). The computer-readable medium may optionally include: a look-up table storing a plurality of first and second sequences of consecutive bits; and/or a table storing data associated with each entry in the data structure.

A further aspect of the invention provides a method of creating a data structure as disclosed herein. The method comprises: creating the first element at a first location; creating the second element at a second location; creating the third element at a third location, the third location being adjacent to the first location; and storing a reference to the second location in the first element.

The first, second and third locations may be locations in memory or locations in a file. In some implementations, the first, second and third locations are initially locations in memory (e.g., in random access memory), but become locations in a file when the array is saved to a file.

The third location may be at a known offset from the first location. Optionally, the method further comprises determining the known offset based on the minimum number of bits needed to store each element. By basing the known offset on the minimum number of number of bits needed to store each element, the overall size of the data structure can be reduced by avoiding 'wasted' bits. In some implementations, the known offset may be equal to the minimum number of bits needed to store each element, such that elements are not aligned to byte boundaries in memory; this further reduces 'wasted' bits.

Optionally, the method further comprises: adding a plurality of entries including the first, second and third entries to a tree; compressing the tree; and outputting the tree in the form of the data structure. The tree allows redundancy in the entries to be identified and eliminated when the tree is compressed. Compressing the tree reduces the size of the resulting data structure. Outputting the tree in the form of the data structure comprises creating an array that embodies the tree, where the array includes at least the first element at the first location, the second element at the second location and the third element at the third location.

Optionally, compressing the tree comprises: identifying a plurality of nodes in the tree that each have a single child node, the plurality of nodes being next to one another on a path from a root node of the tree to a leaf node of the tree; and consolidating the plurality of nodes into a single node.

Optionally, consolidating the plurality of nodes into a single node comprises storing data in a row of a look-up table. The row of the look-up table optionally comprises: a first column comprising a first sequence of consecutive bits; and a second column comprising a second sequence of consecutive bits. The plurality of nodes that each have a single child node may then be replaced by a single node. The single node includes a reference to the row of the look-up table. The first sequence of consecutive bits may be found in one of the first, second or third entries. The second sequence of consecutive bits may be found in another of the plurality of entries.

Compressing the tree optionally comprises identifying a duplicated subtree in the tree. Outputting the tree in the form of the data structure optionally comprises including only one instance of the duplicated subtree in the data structure.

A further aspect of the invention provides a method of retrieving data from a data structure as disclosed herein. The method comprises: receiving a query comprising a binary sequence having a plurality of bits; iteratively evaluating each bit of the query against a respective element of the data structure; identifying an element that stores a value that encodes data associated with an entry stored in the data structure; and retrieving the data associated with the entry.

Data retrieval from the data structure disclosed herein is computationally efficient. This is, in part, because the various techniques disclosed herein to reduce the size of the data structure also reduce the number of pointers that need to be resolved. This is also because the data structure disclosed herein can store a large corpus of data in physical random access memory, which reduces or eliminates latency associated with loading memory pages that have been swapped to disk.

Optionally, iteratively evaluating each bit of the query against a respective element of the data structure includes: identifying an element that stores a reference to one or more sequences of consecutive bits; and evaluating one or more bits of the query against at least one of the one or more sequences of consecutive bits.

Optionally, the method further comprises, based on evaluating one or more bits of the query against at least one of the one or more sequences of consecutive bits, identifying a next bit of the query and a next element of the data structure to evaluate.

Optionally, the one or more sequences of consecutive bits comprise: a first sequence of consecutive bits representing a lower limit of a range; and a second sequence of consecutive bits representing a higher limit of the range.

Optionally, evaluating one or more bits of the query against at least one of the one or more sequences of consecutive bits comprises: determining that the one or more bits of the query are lower than the lower limit of the range; determining that the one or more bits of the query are equal to the lower limit of the range; determining that the one or more bits of the query are greater than the lower limit of the range but lower than the higher limit of the range; determining that the one or more bits of the query are equal to the higher limit of the range; or determining that the one or more bits of the query are greater than the higher limit of the range.

Optionally, retrieving the data associated with the entry comprises: decoding the value stored in the identified element by subtracting the number of elements stored in the data structure.

A further aspect of the invention provides an apparatus configured to perform any of the methods disclosed herein. For example, the apparatus may comprise one or more processors in communication with a memory. The memory may comprise instructions which, when executed by the one or more processors, cause the apparatus to perform any of the methods disclosed herein.

A further aspect of the invention provides a computer program product comprising instructions which, when executed by a computer, cause the computer to perform any of the methods disclosed herein.

A further aspect of the invention provides a computer-readable medium comprising instructions which, when executed by a computer, cause the computer to perform any of the methods disclosed herein. The computer-readable medium may be transitory or non-transitory.

BRIEF DESCRIPTION OF THE DRAWINGS

Embodiments will now be described, purely by way of example, with reference to the accompanying drawings, in which:

FIG. 4 illustrates the tree shown in FIG. 1 after consolidation;

FIGS. 5A and 5B are schematic diagrams illustrating how duplicate subtrees can be removed from the data structure shown in FIG. 1;

DETAILED DESCRIPTION

Data Structure

Figure 1:
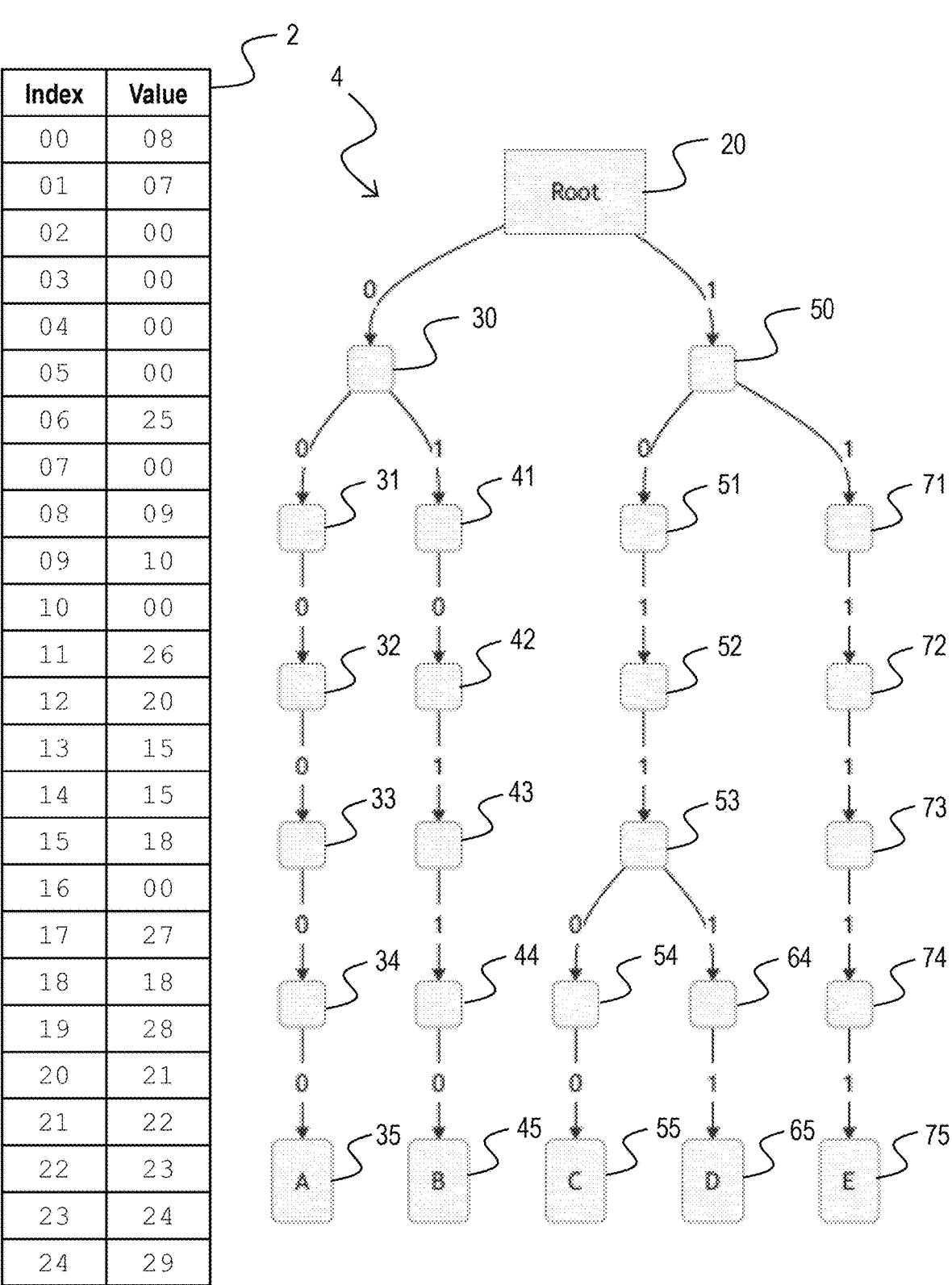
FIG. 1 illustrates an example of a data structure in accordance with the present disclosure alongside a tree representation of the data structure.

FIG. 1 shows an example of a data structure 2 in accordance with the present disclosure. The data structure 2 stores a plurality of data items, each of which is referred to herein as an "entry". Each entry is stored in the data structure in the form of a binary sequence. Each entry comprises a plurality of bits, where each bit has a respective position within the sequence (e.g., a most significant bit, a second most significant bit, a third most significant bit etc., through to a least significant bit) and a value (i.e., zero or one). Purely by way of example, and without limitation, the entries stored in the data structure may be IP addresses, latitudes or longitudes.

Each entry stored in the data structure 2 is associated with a value, which is referred to herein as a "result". The result may be a reference to an item in another data structure or may be a value that is meaningful in its own right (e.g., a number, a text string or a Boolean value of TRUE or FALSE). For example, if an entry is an IP address, its associated result may be a pointer to a row of a table that stores geographic locations. As another example in which an entry is an IP address, the associated result may be a text string representing the geographic location of that IP address.

It should be appreciated that the data structure 2 shown in FIG. 1 and described below is just a simple example. The data structure 2 disclosed herein can be used to store significantly more entries—each comprising significantly more bits—than the example shown. In the example shown in FIG. 1, five entries are stored in the data structure 2. Each entry in this example is a six-bit binary sequence, as shown in Table 1. In Table 1, entry "000000" is associated with result "A", entry "010110" is associated with result "B" and so on.

TABLE 1

| Entry | Result |
| --- | --- |
| 000000 | A |
| 010110 | B |
| 101100 | C |
| 101111 | D |
| 111111 | E |

FIG. 1 also shows the data structure 2 depicted as a tree 4. The tree 4 is a binary tree, i.e., a tree in which each node has no more than two child nodes. The tree 4 comprises a root node 20 which represents the most significant bit of all entries stored in the data structure 2. The root node 20 has two child nodes, 30 and 50, which represent the second most significant bit of a respective entry stored in the data structure 2. Each child node has one or more child nodes. For example, node 30 has two child nodes, 31 and 41, which represent the third most significant bit of a respective entry. Similarly, node 50 has two child nodes, 51 and 71, which represent the third most significant bit of two further entries. Nodes 31, 41, 51 and 71 each have a single child node, 32, 42, 52 and 72 respectively. Nodes 32, 42, 52 and 72 each have a single child node, 33, 43, 55 and 73 respectively. Nodes 33, 43 and 73 each have a single child node, 34, 44 and 74 respectively. Node 53 has two child nodes, 54 and 64. Finally, nodes 34, 44, 54, 64 and 74 each have a single child node, 35, 45, 55, 65 and 75 respectively.

Any node can have zero, one or two child nodes. The depth of the tree 4 is initially equal to the length of (i.e., the number of bits in) the longest entry to be stored in the data structure 2, although the depth of the tree 4 can later be shortened by consolidating nodes as described in more detail below. The nodes at the lowest level of the tree 4 (i.e., nodes, 35, 45, 55, 65 and 75) are known as leaf nodes and have no child nodes. Each leaf node represents the least significant bit of a respective entry stored in the data structure 2.

In the following description, any child node in the tree 4 can be referred to as either "low" or "high". For any given parent node in the tree 4, a path from the parent node to a low child node is followed when the parent node represents a bit of an entry whose value is zero. Conversely, a path from the parent node to a high child node is followed when the parent node represents a bit of an entry whose value is one. Each entry thus defines a unique path from the root node 20 to a leaf node 35, 45, 55, 65, 75 depending on the value of each bit of the entry. For example, the entry "010110" defines a path from the root node 20 to node 45 via nodes 30, 41, 42, 43 and 44.

The data structure 2 is implemented as an array. The array comprises a plurality of elements, where each element corresponds to a respective node of the tree 4. The terms "node" and "element" are, therefore, used interchangeably throughout this document. Each element stores a reference to only one other element at most. To put this another way, each non-leaf node stores a reference to only one of its child nodes. Each element representing a non-leaf node is stored adjacent to the element representing the other of its child nodes. For the sake of consistency, the following description assumes that each non-leaf node stores a reference to its high child node, and is stored adjacent to its low child node. However, the tree could alternatively be implemented with each non-leaf node storing a reference to its low child node, and being stored adjacent to its high child node. Leaf nodes have no child nodes and, therefore, do not store a reference. Each leaf node instead stores a value that encodes data associated with the entry that defines a path from the root node 20 to that leaf node. The data structure 2 is explained in Table 2. In Table 2, the "index" and "stored value" columns are in decimal to aid readability. Each row of Table 2 represents an element in the array. The "index" column represents the location at which an element is stored relative to the other elements in the array. For example, the root node 20 has an index of zero, which indicates that it is stored at the start of the array. Node 30 has an index of one, which indicates that it is the second element in the array and is stored at a location adjacent to the root node 20. Every element in the array has the same size. The location of any element can be determined by multiplying its index by the size (in bits) of each element, then adding the location of the start of the array (or some other fixed reference point in the data structure 2). Each element of the array stores a value. If an element of the array represents a non-leaf node, the value stored in that element is a reference to another element of the array. The reference may be the index of another element in the array, or may be the memory address of another element in the array. If an element of the array represents a leaf node, the value stored in that element is a result associated with the entry that defines a path from the root node 20 to that leaf node.

TABLE 2

| In-dex | Stored value | Low flag | Explanation |
| --- | --- | --- | --- |
| 00 | 08 | 0 | Corresponds to root node 20. Stored value is a reference to node 50. |
| 01 | 07 | 0 | Corresponds to node 30. Node 30 is stored adjacent to node 20. Stored value is a reference to node 41. |
| 02 | 00 | 0 | Corresponds to node 31. Node 31 is stored adjacent to node 30. Stored value is zero because node 31 has only a low child. |
| 03 | 00 | 0 | Corresponds to node 32. Node 32 is stored adjacent to node 31. Stored value is zero because node 32 has only a low child. |
| 04 | 00 | 0 | Corresponds to node 33. Node 33 is stored adjacent to node 32. Stored value is zero because node 33 has only a low child. |
| 05 | 00 | 0 | Corresponds to node 34. Node 34 is stored adjacent to node 33. Stored value is zero because node 34 has only a low child. |
| 06 | 25 | 1 | Corresponds to leaf node 35. Node 35 is stored adjacent to node 34. Node 35 is a leaf node, so stored value is a value associated with entry 000000. Node 35 is a low leaf node, so flag is set. |
| 07 | 00 | 0 | Corresponds to node 41. Stored value is zero because node 54 has only a low child. |
| 08 | 09 | 0 | Corresponds to node 42. Stored value is a reference to node 43. |
| 09 | 10 | 0 | Corresponds to node 43. Stored value is a reference to node 44. |
| 10 | 00 | 0 | Corresponds to node 44. Stored value is zero because node 44 has only a low child. |
| 11 | 26 | 1 | Corresponds to leaf node 45. Node 45 is a leaf node, so stored value is a |

TABLE 2-continued

| In-dex | Stored value | Low flag | Explanation |
|---|---|---|---|
| | | | value associated with entry 101010. |
| | | | Node 45 is a low leaf node, so flag is set. |
| 12 | 20 | 0 | Corresponds to node 50. |
| | | | Stored value is a reference to node 71. |
| 13 | 14 | 0 | Corresponds to node 51. |
| | | | Node 51 is stored adjacent to node 50. |
| | | | Stored value is a reference to node 52. |
| 14 | 15 | 0 | Corresponds to node 52. |
| | | | Stored value is a reference to node 53. |
| 15 | 18 | 0 | Corresponds to node 53. |
| | | | Stored value is a reference to node 64. |
| 16 | 00 | 0 | Corresponds to node 54. |
| | | | Node 54 is stored adjacent to node 53. |
| | | | Stored value is zero because node 54 has only a low child. |
| 17 | 27 | 1 | Corresponds to leaf node 55. |
| | | | Node 55 is stored adjacent to node 54. |
| | | | Node 55 is a leaf node, so stored value is a value associated with entry 101100. |
| | | | Node 55 is a low leaf node, so flag is set. |
| 18 | 19 | 0 | Corresponds to node 64. |
| | | | Stored value is a reference to node 65. |
| 19 | 28 | 0 | Corresponds to node 65. |
| | | | Node 65 is a leaf node, so stored value is a value associated with entry 101111. |
| | | | Node 65 is a high leaf, so flag is not set. |
| 20 | 21 | 0 | Corresponds to node 71. |
| | | | Stored value is a reference to node 72. |
| 21 | 22 | 0 | Corresponds to node 72. |
| | | | Stored value is a reference to node 73. |
| 22 | 23 | 0 | Corresponds to node 73. |
| | | | Stored value is a reference to node 74. |
| 23 | 24 | 0 | Corresponds to node 74. |
| | | | Stored value is a reference to node 75. |
| 24 | 29 | 0 | Corresponds to leaf node 75. |
| | | | Node 75 is a leaf node, so stored value is a value associated with entry 111111. |
| | | | Node 75 is a high leaf node, so flag is not set. |

A result is stored in a leaf node in the form of a number whose value is greater than or equal to the number of elements in the array. The number of elements in the array is equal to the number of nodes in the tree. A leaf node can thus be distinguished from a non-leaf node by the fact that the value stored in a leaf node is greater than or equal to the number of elements in the array. To store a result in a leaf node, the result is encoded by adding its numeric value to the number of elements in the array. The encoded value is then stored in the element of the array that represents the leaf node. To retrieve a result from a leaf node, the number of elements in the array is subtracted from the value stored in the element of the array that represents the leaf node.

By way of illustration, consider a simple example in which the array has 50 elements, and it is desired to store data with a numeric value of 10 in a leaf node. The data is encoded by adding the number of elements (i.e., 50) to the numeric value of the data (i.e., 10), which gives an encoded data value of 60. A value of 60 is then stored in the element of the array that represents the leaf node in question. That element can easily be identified as being a leaf node because the value stored therein (i.e., 60) is greater than the number of elements in the array (i.e., 50). To decode the data in the leaf node, the number of elements in the array is subtracted from the value stored in the element of the array that represents the leaf node, yielding the original numeric value of the data.

If a result is sufficiently small that it can be stored within the leaf node, the result may be stored in the array itself (in an encoded form, as described above). For example, if the result is a simple flag indicating whether to grant or deny a service to a particular IP address, the flag may be stored in the element of the array that represents the leaf node for the entry representing the IP address in question.

Alternatively, if a result is too large to be stored within the leaf node, the result is stored in a separate data structure. For example, each result may be stored in a respective row of a separate table, where each row of the table has a unique identifier. The leaf node associated with a particular element stores, in an encoded form, the unique identifier of which-ever row of the table contains the result.

Table 3 is an example of how results can be stored in a separate data structure. Each row of the table stores a unique identifier and a corresponding result. The unique identifier is referred to as a "result index" and is unique within Table 3. In this example, the results represent geographic locations. The leaf node associated with a particular entry stores, in an encoded form, the result index of whichever row of the table contains a geographic location associated with that entry. Consider entry "00000", which is associated with result "A". Node 35 is the leaf node for entry "00000" and, in Table 2, the stored value for node 35 is "25". The stored value is decoded by subtracting the stored value (i.e., 25) from the number of elements in the data structure (also 25), yielding a result index of "0". The result index "0" references the first row of Table 3, which corresponds to result "A". It can thus be determined that the geographic location associated with entry "00000" is "United Kingdom".

TABLE 3

| Result index | Result | Explanation |
|---|---|---|
| 0 | "United Kingdom" | This row corresponds to result "A" of Table 1. The stored value is a text string indicating that entries which reference this row are in the United Kingdom. |
| 1 | "London, United Kingdom" | This row corresponds to result "B" of Table 1. The stored value is a text string indicating that entries which reference this row are in London, UK. |
| 2 | "Camden, London, United Kingdom" | This row corresponds to result "C" of Table 1. The stored value is a text string indicating that entries which reference this row are in the Camden area of London. |
| 3 | "United States of America" | This row corresponds to result "D" of Table 1. The stored value is a text string indicating that entries which reference this row are in the United States of America. |
| 4 | "51.0, –0.91" | This row corresponds to result "E" of Table 1. The stored value is a text string indicating that entries which reference this row have a latitude of 51.0° and a longitude of –0.91°. |

Geographic locations are stored as text strings in the example shown in Table 3, but in other implementations the geographic locations could be stored in another form. For example, in alternative implementation the geographic loca-tions could be stored as a set of numeric coordinate values that collectively define the boundaries of a real-world geo-graphic location. Using a separate data structure to store information pertaining to a particular IP address allows the size of the data structure 100 to be kept as small as possible, by avoiding the need for each element of the data structure to be large enough to store such information.

Referring again to Table 2, each element may also include a low flag. The low flag is a single bit. The flag is set only when the element is a low leaf node of the tree. The low flag allows an element that is a low leaf node to be distinguished from a node that indicates its high child node is a leaf node. In the example shown in Table 2, the low flag is set when its value is one, and not set when its value is zero. In an alternative implementation, the low flag could set when its value is zero, and not set when its value is one. It should be appreciated that, if the tree were to be implemented with each non-leaf node storing a reference to its high child node, then each node would instead include a high flag that would be set only when an element is a high leaf node of the tree.

Creating the Data Structure

Figure 2:
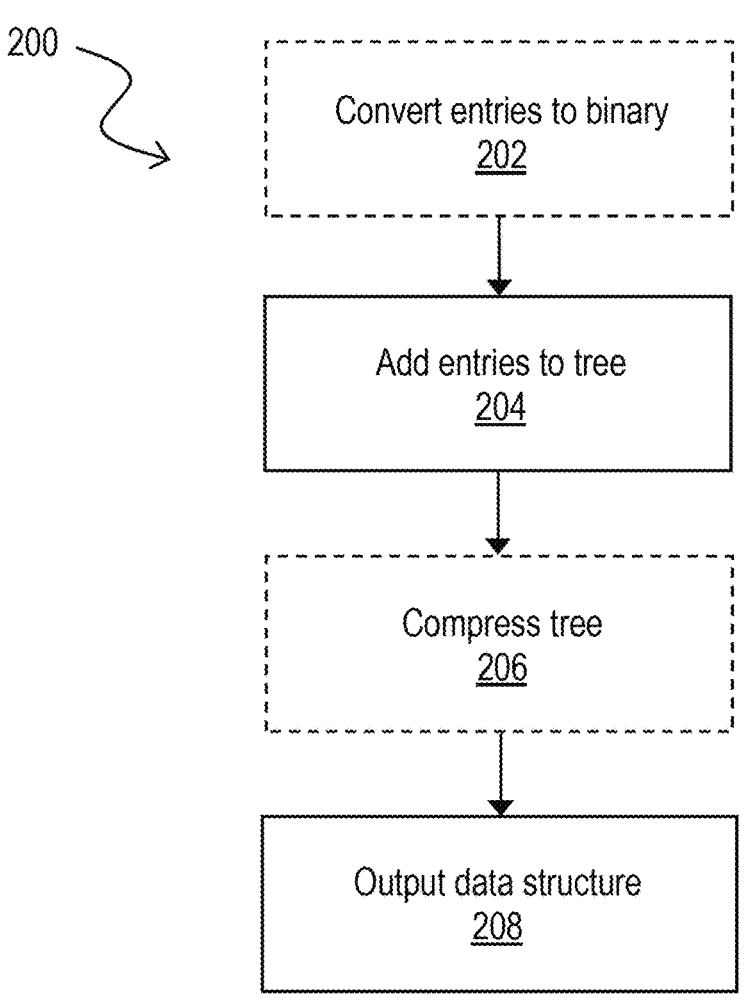
FIG. 2 is a flow diagram of a method of creating the data structure shown in FIG. 1.

A method 200 of creating the data structure 2 will now be described with reference to FIG. 2.

The method 200 optionally begins at operation 202, in which all entries to be inserted into the data structure 2 are converted to binary form. For example, if an entry is in the form of text string "44", it is converted to its corresponding binary representation, i.e., "101100." The method 200 then proceeds to operation 204. Operation 202 need not be performed if the entries are already in binary form, in which case the method begins at operation 204.

At operation 204, all entries to be inserted into the data structure 2 are added to a binary tree. For example, the entries (in binary form) are added to a binary tree such as the tree 4 shown in FIG. 1. The binary tree can be constructed using any suitable technique because, at this stage of the method 200, each node in the binary tree is permitted to include a reference to both of its child nodes. Moreover, the memory location of each node is not important at operation 204. The binary tree will be organised at operation 208 (discussed in detail below) such that each non-leaf node stores a reference to only one of its child nodes, and such that each element representing a non-leaf node is stored adjacent to the element representing the other of its child nodes.

A suitable technique for adding entries to the binary tree at operation 204 is as follows. Initially, when no entries have been added to the tree 4, a root node 20 is created, which forms the entry point into the tree 4. Each bit of an entry is evaluated in turn, starting with the most significant bit. A new branch node is added to the tree 4 whenever one is needed to store the most recently-evaluated bit of the entry. When a branch node already exists, but does not yet have a child node, the child node is populated. When the final bit of an entry is reached, a leaf node is added to the tree 4 and the result associated with that entry is stored in the leaf node. The process is repeated until all entries, and their corresponding results, have been added to the tree 4. The entries can be added to the tree 4 in any order. The same entry may not be added to the tree 4 more than once, even if each instance of the entry is associated with a different result. The tree 4 need not be fully populated (in other words, not every possible node of the tree may need to be created in order to store a given set of entries).

When all entries have been added to the tree 4, the method 200 may optionally proceed to operation 206, at which the tree is compressed. However, a significant reduction in the amount of space needed to store the entries may be achieved by the way in which data is stored at operation 208, even if the tree is not compressed. Therefore, after operation 204 is complete, execution of the method may alternatively proceed immediately to operation 208.

Figure 3:
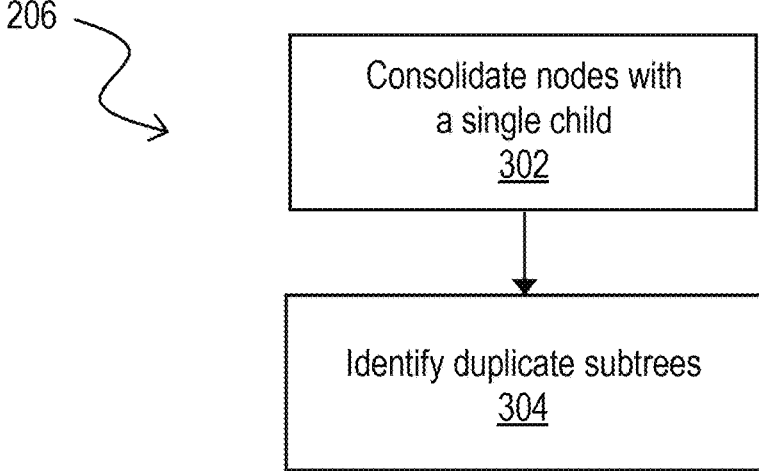
FIG. 3 is a flow diagram of a method of compressing a tree.

At operation 206, which is optional, the tree 4 is compressed. The constituent operations of operation 206 are illustrated in FIG. 3. In more detail, operation 206 may comprise either or both of: consolidating nodes with a single child node at operation 302; and identifying duplicate subtrees at operation 304. In the following discussion, it will be assumed that both operations 302 and 304 are performed, with operation 302 being performed before operation 304.

In operation 302, any nodes in the tree 4 with a single child node are identified. When two or more such nodes are next to one another on a path from the root node 20 to a leaf node 35, 45, 55, 65, 75, those two or more nodes can be eliminated. A look-up table is created to store each consecutive sequence of bits that was represented by the eliminated nodes. The parent node of each set of eliminated nodes stores a reference to a row of the look-up table.

For example, when consolidating the tree 4 illustrated in FIG. 1, nodes 31, 32, 33, 34, 41, 42, 43, 44, 51, 52, 54, 64, 71, 72, 73 and 74 are all identified as being nodes with a single child node. Furthermore, nodes 31, 32, 33 and 34 are all next to one another on a path from the root node 20 to the leaf node 35. Nodes 31, 32, 33 and 34 can therefore be eliminated, and the low branch of their parent node 30 then represents the sequence "00000" within an entry. Similarly, nodes 41, 42, 43 and 44 are all next to one another on a path from the root node 20 to the leaf node 34, so can be eliminated; the high branch of their parent node 30 then represents the sequence "10110". Nodes 51, 52 and 53 are all next to one another on a path from the root node 20 to the leaf nodes 55 and 56, so can be eliminated; the low branch of their parent node 50 then represents the sequence "011". Nodes 54 and 55 are next to one another on a path from the root node 20 to the leaf node 55, so can be eliminated; the low branch of their parent node 53 then represents the sequence "000". Nodes 64, 65 and 71 to 75 can be similarly eliminated. The outcome of operation 304 in this example is the consolidated tree 80 shown in FIG. 4. The twenty-five nodes present in the original tree 4 have been reduced to nine nodes in the consolidated tree 80, which reduces the size of the data structure 2 when it is output at operation 208.

To allow results to be retrieved from the consolidated tree 80, a look-up table (referred to herein as the "span look-up table") is created to indicate which consecutive sequence of bits within an entry are represented by the parent node of the eliminated nodes. Table 4 illustrates the span look-up table created for the consolidated tree 80.

TABLE 4

| Span index | Low limit | High limit |
|---|---|---|
| 0 | 0 | 1 |
| 1 | 00000 | 10110 |
| 2 | 011 | 11111 |
| 3 | 00 | 11 |

Each row of Table 4 corresponds to a parent node whose child nodes were eliminated earlier in operation 302. Each row in Table 4 is referred to as a "span" for reasons that will become clear when the method 700 of retrieving results is explained. Each span comprises a unique identifier, which is stored in the "span index" column. Each span also comprises a "low limit" and a "high limit", which are the sequences of bits represented by the low branch and high branch of the parent node, respectively. Each parent node whose child nodes were eliminated stores a reference to a row of the span look-up table (e.g., by storing a span index).

For example, the span with span index "1" relates to node 30. Its low limit corresponds to the low branch of node 30 and represents the sequence "00000". Its high limit corresponds to the high branch of node 30 and represents the sequence "10110". As another example, the span with span index "2" relates to node 50. Its low limit corresponds to the low branch of node 50 and represents the sequence "011". Its high limit corresponds to the high branch of node 30 and represents the sequence "11111". As a final example, the span with span index "3" relates to node 53. Its low limit corresponds to the low branch of node 53 and represents the sequence "00". Its high limit corresponds to the high branch of node 53 and represents the sequence "11".

Table 4 also includes a single-bit span with span index "0", which corresponds to the root node 20. Its low limit corresponds to the low branch of the root node 20 and represents the single-bit sequence "0". Its high limit corresponds to the high branch of the root node 30 and represents the single-bit sequence "1". Although this single-bit span does not reduce the size of the data structure 2, its presence simplifies implementation of the method 700 of retrieving a result from the data structure by ensuring that every non-leaf node in the data structure 2 includes a reference to a span. Creating a single-bit span at operation 302 is optional.

The same span may occur at multiple locations within a consolidated tree 80. In other words, two or more different parent nodes may each have the same low limit and the same high limit. In this case, all parent nodes with the same low and high limits can store a reference to the same row of the span look-up table.

In some implementations, a technique referred to herein as "clustering" is performed during operation 302 to reduce the number of bits needed to store the span index. When clustering is performed, a plurality of look-up tables (referred to herein as "cluster look-up tables") are created. Each cluster look-up table is associated with a respective subset of nodes of the consolidated tree 80. Each row of each cluster look-up table stores an identifier, which is referred to as a "cluster index". The cluster indexes are unique within each cluster look-up table. However, cluster indexes are shared between different cluster look-up tables. Each row of each cluster look-up table also stores a reference to a row of a span look-up table. More specifically, each row of each cluster look-up table stores a span index. When clustering is performed, the parent node of each set of nodes eliminated earlier in operation 302 stores a reference to a row of one of the cluster look-up tables (in other words, the parent node stores a cluster index); that row of the cluster look-up table stores a span index corresponding to the parent node.

Figure 9:
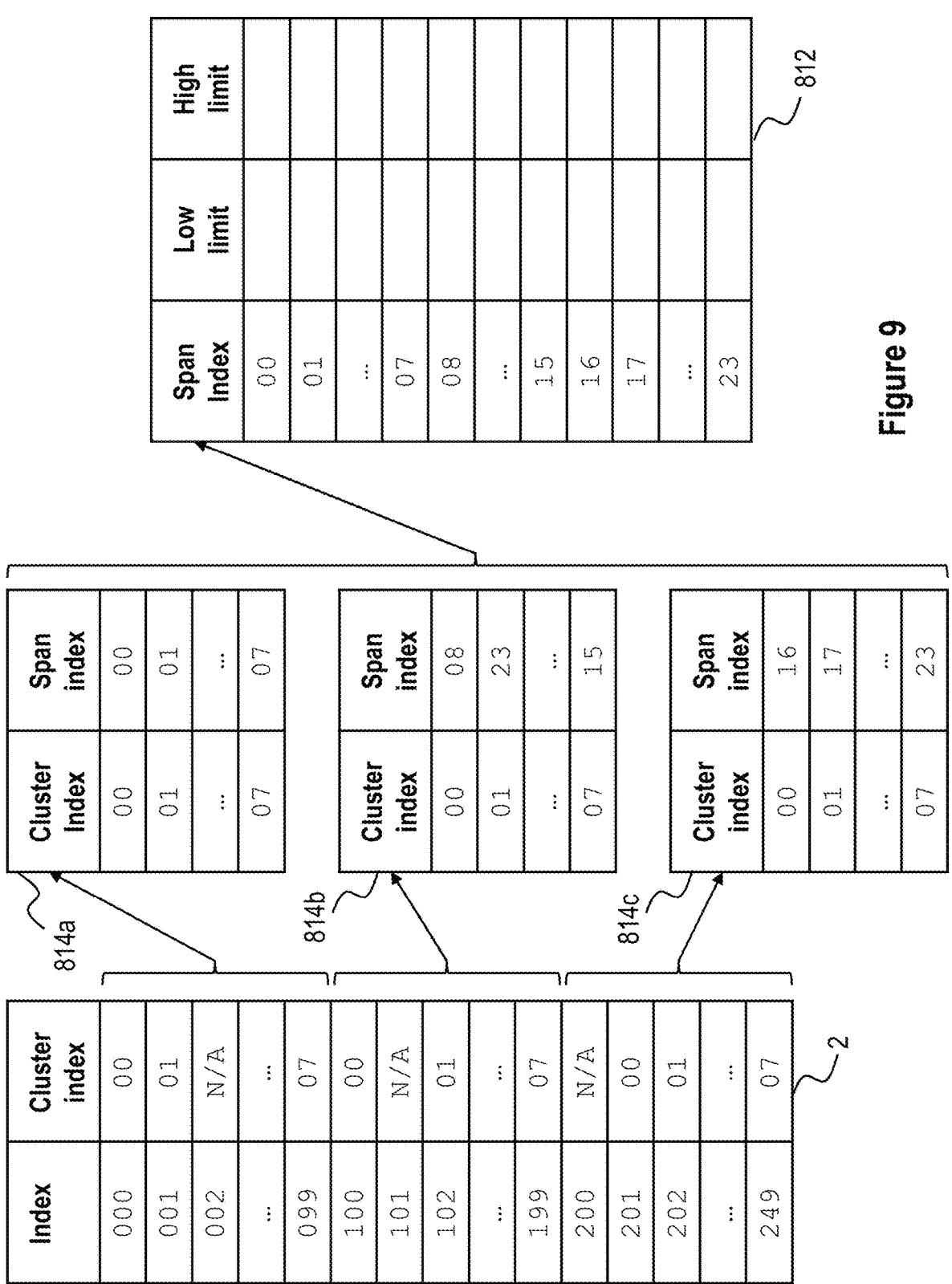
FIG. 9 illustrates an example of a data structure in accordance with the present disclosure in which clustering is used.

FIG. 9 illustrates a simple example of clustering. FIG. 9 shows a data structure 2 in accordance with the present disclosure, together with three cluster look-up tables 814*a*, 814*b*, 814*c* and a span look-up table 812. For the sake of clarity, not all elements of the data structure 2 are shown, and not all rows of the look-up tables 812, 814*a*, 814*b*, 814*c* are shown. In this example, the data structure 2 has two hundred and fifty elements, each of which has a unique index numbered from "000" to "249" (in decimal). The "cluster index" column of data structure 2 can store a reference to a row of one of cluster look-up tables 814*a*, 814*b*, 814*c*. More specifically, elements "000" to "099" can store a reference to a row of a first cluster look-up table 814*a*, elements "100" to "199" can store a reference to a row of a second cluster look-up table 814*b*, and elements "200" to "249" can store a reference to a row of a third cluster look-up table 814*c*. In this example, the cluster indexes in the data structure 2 have values between "00" and "07" (in decimal), which means that every possible cluster index can be represented using only three bits. Not all elements of the data structure 2 store a reference to a cluster look-up table. In particular, elements that store a value do not include a reference to a cluster look-up table. Elements that do not store a reference to a cluster look-up table are indicated in FIG. 9 by "N/A" in their cluster index.

Each cluster look-up table 814*a*, 814*b*, 814*c* has eight rows, where each row corresponds to a respective one of the possible cluster indexes. Each row of the cluster look-up table 814*a*, 814*b*, 814*c* stores a reference to a row of the span look-up table 812. The span look-up table 812 has the same form as that shown above in Table 4, but in this example has twenty-four rows. The "low limit" and "high limit" columns of the span look-up table 812 are left blank in FIG. 9 for the sake of clarity. There is a one-to-many mapping between cluster indexes in the data structure 2 and span indexes in the span look-up table 812. For example, cluster index "00" can reference either: span index "00" for the element with index "000", when cluster look-up table 814*a* is used; span index "08" for the element with index "100", when cluster look-up table 814*b* is used; or span index "16" for the element with index "201", when cluster look-up table 814*c* is used. The cluster indexes of different cluster look-up tables 814*a*, 814*b*, 814*c* may reference the same row of the span look-up table 812. For example, cluster index "01" of cluster look-up table 814*b* and cluster index "07" of cluster look-up table 814*b* both store a reference to span index "23" of the span look-up table 812.

In the simple example of FIG. 9, twenty-four spans are stored in the span look-up table 812. Without the use of clustering, each element of the data structure 2 would require five bits to store a reference to each row of the span look-up table 812. With clustering, each element of the data structure 2 requires only three bits to store a reference to each row of one of the cluster look-up tables 814*a*, 814*b*, 814*c*. Clustering thus reduces the size of the data structure 2 by two bits per element, or five hundred bits (approximately sixty-three bytes) in total. Clustering can achieve a considerable overall reduction in size of the data structure 2 when performed on real data.

Trial and error is used to find the "optimal" length of the cluster index for a given data set. Using fewer bits for the cluster index reduces the size of each element of the data structure 2. However, using fewer bits for the cluster index also increases the number of low child nodes in the data structure 2. There is, therefore, a trade-off between the size of each element and the total number of nodes in the data structure 2. Trial and error is used to find a length (in bits) of the cluster index that results in the smallest overall size of the data structure 2.

In some implementations of clustering, the span index may have zero bits. In such implementations, there is only one span index for each cluster.

Operation 302 is now complete, and the method then continues to operation 304.

At operation 304, any duplicate subtrees in the tree 4 (if operation 302 was omitted) or consolidated tree 80 (if operation 304 was performed) are identified. A subtree is a duplicate if it occurs two or more times in the tree 4 or consolidated tree 80. For example, FIG. 5A shows two duplicate subtrees, 90 and 92. The subtrees 90 and 92 are identical because they each have one branch node (B1 and B2, respectively), which has the same leaf nodes (L1 and L2). The size of the data structure output at operation 208 can be reduced by omitting one of the subtrees. This is illustrated in FIG. 5B, in which the subtree 92 is omitted. Both branches of the parent node B0 of the remaining subtree 90 reference the same branch node B1. Although the duplicate subtrees 90, 92 in the example shown in FIGS. 5A and 5B have the same parent node B0, this is not essential.

Duplicate subtrees can be identified anywhere within the tree 4 or consolidated tree 80.

An example technique for identifying duplicate subtrees will now be described. In this example, duplicate subtrees are identified by creating, for each node in the tree 4 or consolidated tree 80, a sequence of bytes representing all possible descendants of that node. Each sequence of bytes is added to a dictionary, along with an identifier of the node. If two nodes have the same sequence of bytes, these nodes are at the root of a duplicate subtree; the identifier(s) of each such node are added to the same entry in the dictionary. When each node of the data structure 2 is output at operation 208 (more specifically, at operations 606 and 608 of operation 208), the dictionary is checked to determine whether that node is at the root of a duplicate subtree. If so, that subtree is only output once in the data structure 2. Second and subsequent instances of that subtree reference the first instance of the subtree in the data structure 2. This reduces redundancy in the data structure 2, and thereby reduces the size of the data structure. Other techniques for identifying duplicate subtrees are possible, and may be performed at operation 304.

Operation 304 is now complete, and the method then continues to operation 208.

Figure 6:
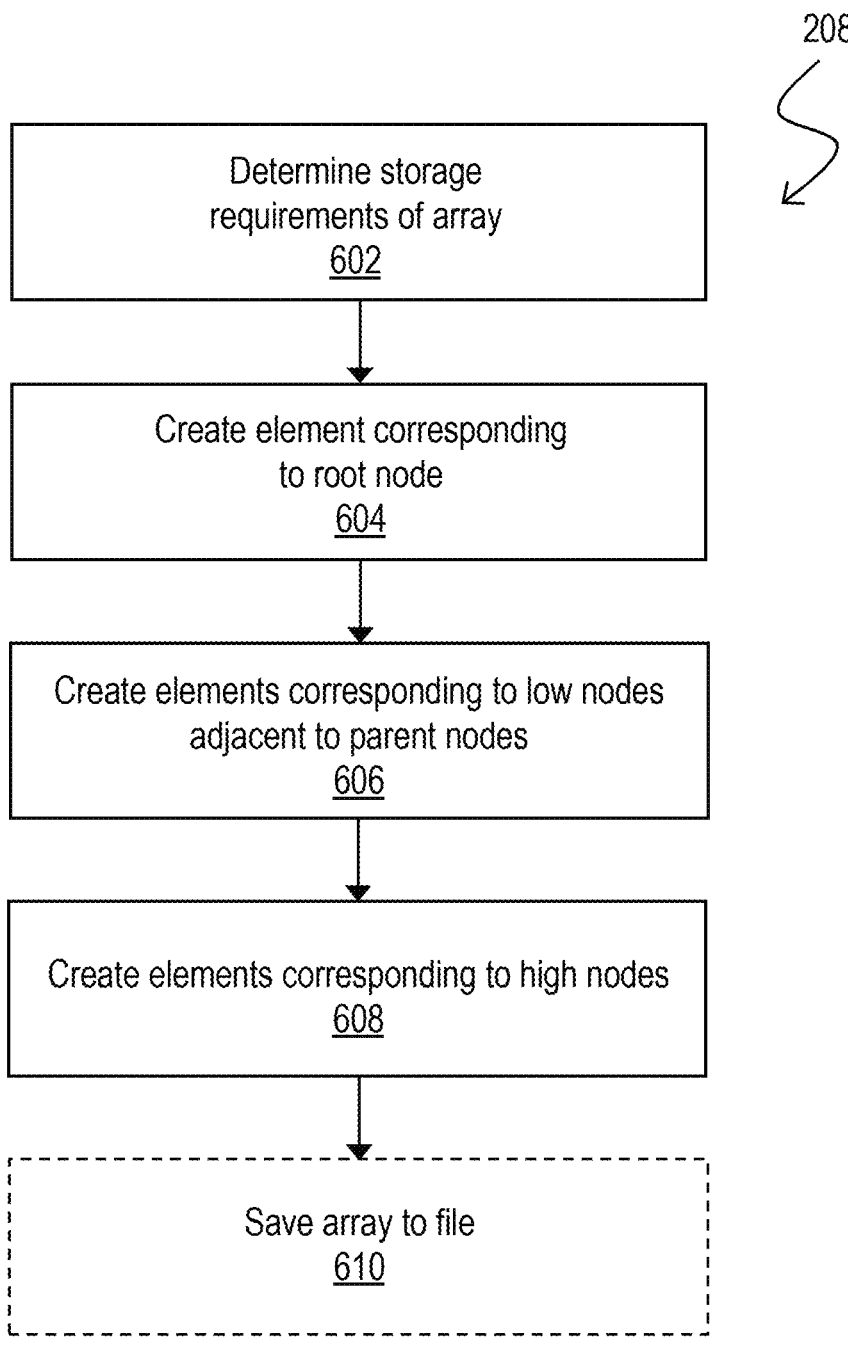
FIG. 6 is a flow diagram of an example of a method of outputting the data structure shown in FIG. 1.

At operation 208, the data structure 2 is output. Operation 208 involves creating an array that embodies the tree 4 (if operation 302 was omitted) or the consolidated tree 80 (if operation 302 was performed) with each element stored at a location that minimises the size of the data structure 2. The constituent operations of operation 208 are illustrated in FIG. 6 and begin with operation 602.

At operation 602, the storage requirements of the data structure 2 are determined. Operation 602 comprises determining the total number of elements in the tree 4 or the consolidated tree 80. Operation 602 further comprises determining the size of each element. To minimise the total size of the data structure 2, the size of each element in bits (not bytes) is calculated. This is because overhead in the data structure can be reduced by making each element the exact minimum number of bits needed to store its constituent data, without aligning elements to byte boundaries in memory. All elements have the same size. The size of each element is equal to the sum of: (i) the number of bits needed to represent the sum of the total number of elements and the total number of results; (ii) the number of bits needed to represent the span indexes if a consolidated tree 80 was formed at operation 302, or the cluster indexes if clustering was performed at operation 302; and (iii) one bit to represent the low flag. The size of each element determined at operation 602 can be used as a known offset that allows the location in memory, or the location in a file, of one element relative to another element to be calculated.

In the example given above, the consolidated tree 80 has nine nodes and stores five results. Therefore, four bits are needed to represent the sum of the total number of elements and the total number of results (since nine plus five is fourteen, which is "1110" in binary, meaning that four bits are needed). The maximum span index in Table 4 is three, so only two bits are needed to represent the span index (since three in decimal is "11" in binary, meaning that two bits are needed). The low flag is always one bit. Thus, the minimum size of each element in this example is seven bits. The offset between two adjacent elements in the array will be seven bits.

At operation 604, an element corresponding to the root node 20 is created. In more detail, a contiguous block of memory locations is preferably allocated to store the data structure 2. The element corresponding to the root node is created at the first memory location of the contiguous block. The element corresponding to the root node 20 is populated with the bits "0100000", in which the first four bits ("0100") are the index of the high child node 50, the next two bits ("00") are the span index, and the final bit ("0") is the low flag.

At operation 606, an element corresponding to each low child node is created. Each such element is created at a location adjacent to its respective parent node. For example, an element corresponding to node 30 is created at a location adjacent to the root node 20. The memory location of the first bit of the element corresponding to node 30 is immediately after the memory location of the last bit of the element corresponding to the root node 20. In the specific example mentioned above where the minimum size of each element is seven bits, the memory location of the first bit of the element corresponding to node 30 is seven bits after the memory location of the first bit of the element corresponding to the root node 20. As another example, an element corresponding to leaf node 35 is created at a location adjacent to node 30. The memory location of the first bit of the element corresponding to node 35 is immediately after the memory location of the last bit of the element corresponding to the node 30. In the specific example mentioned above, the memory location of the first bit of the element corresponding to node 35 is seven bits after the memory location of the first bit of the element corresponding to node 30. Similarly, an element corresponding to node 53 is created at a location adjacent to node 50, and an element corresponding to node 55 is created at a location adjacent to node 53.

At operation 608, an element corresponding to each high child node is created. Unlike the low child nodes created operation 606, the location of the high child nodes is not critical. The high child nodes can be stored anywhere within the contiguous block of memory locations allocated to store the data structure, provided they are not located between nodes that should be stored adjacent to each other.

When an element created at operation 606 or 608 has a high child node, operation 606 or 608 includes storing a reference to the high child node in that element. For example, the high child node of node 30 is node 45. Thus, a reference to node 45 is added by storing the index of node 45 ("0011") in the first four bits of the element representing node 30.

When an element created at operation 606 or 608 represents a leaf node, operation 606 or 608 includes encoding the result (or a reference to the result). Operation 606 or 608 further include storing the encoded result (or the encoded reference to the result) in such elements. For example, node 35 is a leaf node for result "A". With reference to Table 3, the result index corresponding to result "A" is "0". The result index is encoded by adding it to the total number of nodes (in this case, nine). The encoded result is nine (since nine plus zero equals nine), so "1001" is stored in the first four bits of the element representing node 35.

Operations 606 and 608 further include storing a span index in each element. For example, with reference to Table 4, the span with span index "1" relates to node 30. Therefore, a span index of "01" is stored in the fifth and sixth bits of the element representing node 30. If clustering was performed, operations 606 and 608 include storing a cluster index in each element, instead of storing a span index.

When the element created at operation 606 represents a low leaf node, operation 606 further includes setting the low flag. For example, node 35 is the low leaf node of node 30. Therefore, the low flag is set by setting the final bit of the element representing node 35 to "1". As another example, node 55 is the low leaf node of node 53. Therefore, the low flag is set by setting the final bit of the element representing node 55 to "1".

The low flag is not set for any elements created at operation 608 that represent leaf nodes. This is because the elements created at operation 608 always correspond to high child nodes.

When performing operations 606 and 608, any duplicate subtrees previously identified at operation 304 are omitted. That is, rather than creating multiple new elements that would duplicate an existing subtree, a single element is created that contains a reference to the existing subtree. The dictionary populated at operation 304 may be checked before creating each element at operation 606 or 608, to check whether that element is at the root of a duplicate subtree. If that element is at the root of a duplicate subtree, operations 606 and/or 608 are only performed for the first instance of that subtree. For the second and subsequent instances of the subtree, an element is created that contains a reference to the first instance of the subtree.

Operations 606 and 608 can be performed in any order. Moreover, operations 606 and 608 can be interleaved or performed in parallel, such that one operation need not be completed before the other operation can begin.

Optionally, at operation 610, the array produced by the preceding operations can be saved as a file. This is useful if the data structure 2 is to be used on a different computing device from that on which it was created.

The method 200 is then complete, and the data structure 2 is ready for use. Table 5 illustrates the resulting data structure 2 when the tree was compressed at operation 206. In Table 5, the "index" and "stored value" columns are in binary.

TABLE 5

| Index | Stored value | Explanation |
| --- | --- | --- |
| 0000 | 0100000 | Corresponds to root node 20. Stored at the start of the array. Bits 0-3 ("0100") are a reference to node 50. Bits 4-5 ("00") are a reference to span index "0". Bit 7 ("0") is the low flag, which is not set. |
| 0001 | 0011010 | Corresponds to node 30. Stored adjacent to node 20. Bits 0-3 ("0011") are a reference to node 45. Bits 4-5 ("01") are a reference to span index "1". Bit 7 ("0") is the low flag, which is not set. |
| 0010 | 1001001 | Corresponds to leaf node 35. Stored adjacent to node 30. Bits 0-3 ("1001") encode a reference to result index "0". Bits 4-5 ("00") do not matter. Bit 7 ("1") is the low flag, which is set. |
| 0011 | 1010000 | Corresponds to leaf node 45. Bits 0-3 ("1010") encode a reference to result index "1". Bits 4-5 ("00") do not matter. Bit 7 ("0") is the low flag, which is not set. |
| 0100 | 1000100 | Corresponds to node 50. Bits 0-3 ("1000") are a reference to node 75. Bits 4-5 ("10") are a reference to span index "2". Bit 7 ("0") is the low flag, which is not set. |
| 0101 | 0111110 | Corresponds to node 53. Stored adjacent to node 50. Bits 0-3 ("0111") are a reference to node 65. Bits 4-5 ("11") are a reference to span index "3". Bit 7 ("0") is the low flag, which is not set. |
| 0110 | 1011001 | Corresponds to leaf node 55. Stored adjacent to node 53. Bits 0-3 ("1011") encode a reference |

TABLE 5-continued

| Index | Stored value | Explanation |
| --- | --- | --- |
| | | to result index "2". Bits 4-5 ("00") do not matter. Bit 7 ("1") is the low flag, which is set. |
| 0111 | 1100000 | Corresponds to leaf node 65. Bits 0-3 ("1100") encode a reference to result index "3". Bits 4-5 ("00") do not matter. Bit 7 ("0") is the low flag, which is not set. |
| 1000 | 1101000 | Corresponds to leaf node 75. Bits 0-3 ("1101") encode a reference to result index "4". Bits 4-5 ("00") do not matter. Bit 7 ("0") is the low flag, which is not set. |

Retrieving a Result from the Data Structure

Figure 7:
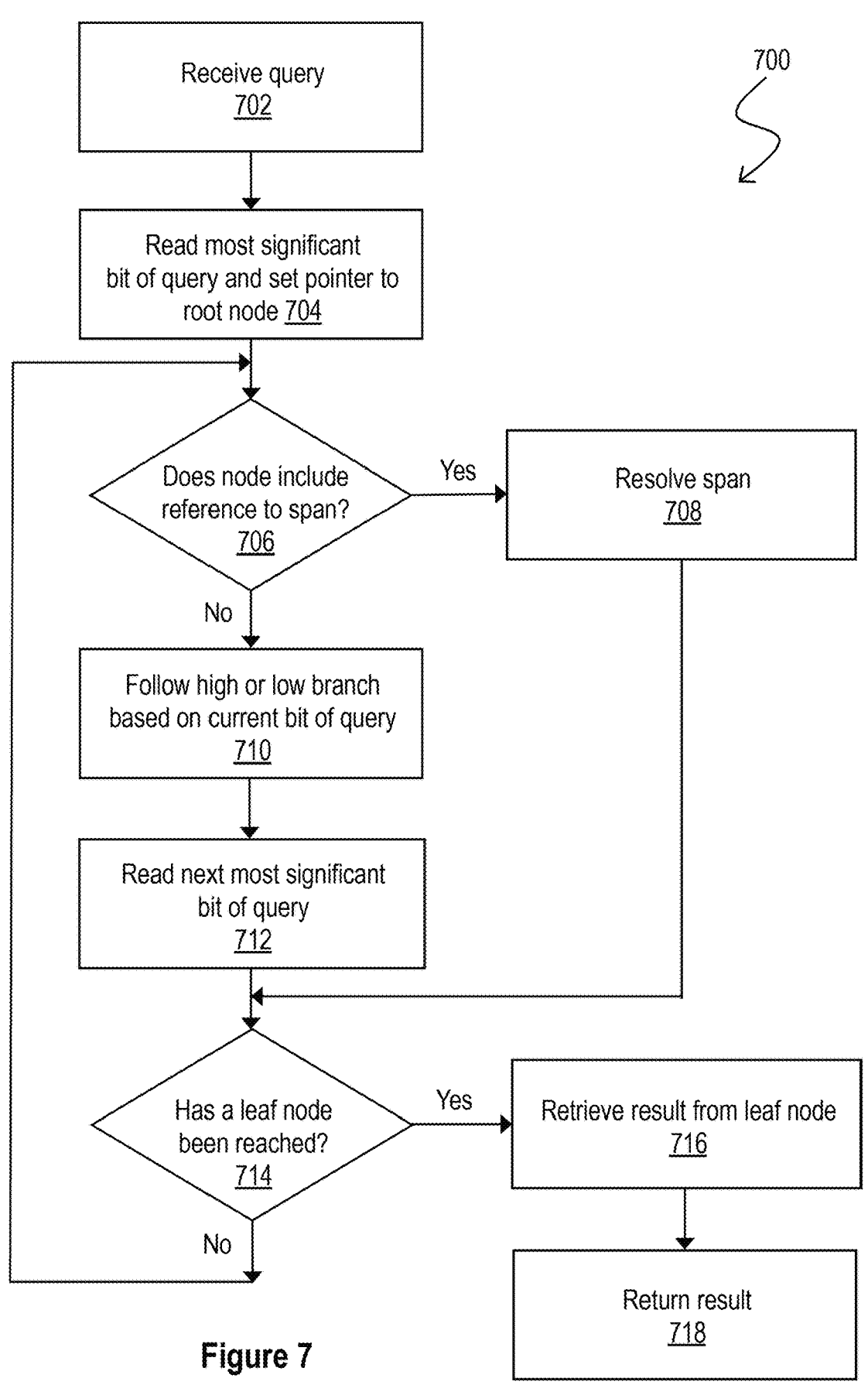
FIG. 7 is a flow diagram of a method of retrieving a result from the data structure shown in FIG. 1.

A method 700 of retrieving a result from the data structure 2 will now be described with reference to FIG. 7.

The method 700 begins at operation 702, in which a query is received. As used herein, the term "query" refers to a binary sequence that is to be compared with the entries stored in the data structure 2 to retrieve a result.

At operation 704, the most significant bit of the query is read. For example, a bit mask may be applied to the query to isolate the most significant bit of the query. Also at operation 704, a pointer to the root node 20 of the data structure 2 is set. For example, a pointer may be set to the location in memory, or location within a file, at which the root node 20 is stored.

At operations 706 to 710, bits of the query are evaluated against respective nodes of the data structure 2. In the first iteration of operations 706 to 710, the most significant bit of the query (which was read at operation 704) is evaluated against the root node 70 of the data structure 2. In the second and subsequent iterations of operations 706 to 710, the remaining bits of the query (each of which was read at a respective iteration of operation 712) are evaluated against the corresponding nodes of the data structure 2, working from the more significant bits towards the least significant bit. In the following, the term "current node" refers to the node of the data structure 2 being considered at a given iteration of operations 706 to 710.

Operation 706 comprises determining whether the current node includes a span. For example, the bits of the value stored in the current node are evaluated to determine whether they include a span index that references a valid entry in a span look-up table such as that illustrated in Table 4. For the example data structure 2 illustrated in Table 5, bits four and five of the stored value are evaluated to identify one of the span indices of Table 4. If the current node includes a span, the method 700 proceeds to operation 708. If the current node does not include a span, the method 700 proceeds to operation 710. The current node will not include a span if operation 302 was not performed when the data structure 2 was created.

If clustering was performed as part of operation 302 when creating the data structure 2, operation 706 comprises resolving a cluster index stored in the current node to identify a span. In more detail, the bits of the value stored in the current node are evaluated to determine whether they include a cluster index. If the current node includes a cluster index, the cluster look-up table 814 associated with the current node is identified. For example, a header may be consulted to identify which one of a plurality of cluster look-up tables 814a, 814b, 814c is associated with the current node. The cluster index stored in the current node is then used to retrieve a span index from the cluster look-up table 814 associated with the current node. The resulting span index is used to identify a span in a span look-up table 812.

At operation 708, the span identified at operation 706 is resolved. To resolve the span, the low limit and the high limit are retrieved from the row of the span look-up table referenced by the span index found at operation 706. The current bit of the query is compared with the low limit and/or the high limit of the span. If the low limit and/or high limit comprises multiple bits, an equal number of bits of the query are compared with the respective limit. For example, consider the span with span index "2" in Table 4. The low limit of this span comprises three bits and, therefore, the current bit of the query plus the next two bits of the query are compared with the low limit. The high limit of this span comprises five bits and, therefore, the current bit of the query plus the next four bits of the query are compared with the high limit. In the following, the term "current bit(s)" refers to the current bit of the query plus any next bits of the query needed to allow a comparison with the low limit or high limit of a span.

One of the following five outcomes is possible when the current bit(s) of the query are compared with the low limit and/or the high limit of the span:

1. The current bit(s) are lower than the low limit. In this case, the tree is traversed backwards from the current node to the previous high child node. The low child node of the previous high child node is followed, then the high child node of each subsequent node is followed until a leaf node is reached. To follow the low child node of the previous high child node, a pointer may then be set to the location in memory, or to the location within a file, adjacent to the previous high child node. To follow the high child node of each subsequent node, the reference to the child node stored in each subsequent node is iteratively determined. A pointer may then be set to the location in memory, or to the location within a file, indicated by that reference. The process repeats until a leaf node is reached.

2. The current bit(s) are equal to the low limit. In this case, the low child node of the current node is followed. To follow the low child node, a pointer may then be set to the location in memory, or to the location within a file, adjacent to the current node. The value stored in that address or location is used when performing the next iteration of operation 714 and/or 706. Additionally, the next most significant bit of the query after the current bit(s) is read. For example, a bit mask previously applied to the query may be shifted to isolate the next most significant bit of the query. The bit mask is shifted by a number of bits equal to the number of bits in the low limit.

3. The current bit(s) are greater than the low limit but lower than the high limit. In this case, the low child node of the current node is followed, then the high child node of each subsequent node is followed until a leaf node is reached. To follow the low child node of the current node, a pointer may then be set to the location in memory, or to the location within a file, adjacent to the current node. To follow the high child node of each subsequent node, the reference to the child node stored in each subsequent node is iteratively determined. A pointer may then be set to the location in memory, or to the location within a file, indicated by that reference. The process repeats until a leaf node is reached.

4. The current bit(s) are equal to the high limit. In this case, the high child node of the current node is followed. To follow the high child node, the reference to the child node stored in the current node is determined. A pointer may then be set to the location in memory, or to the location within a file, indicated by that reference. The value stored in that address or location is used when performing the next iteration of operation 714 and/or 706. Additionally, the next most significant bit of the query after the current bit(s) is read. For example, a bit mask previously applied to the query may be shifted to isolate the next most significant bit of the query. The bit mask is shifted by a number of bits equal to the number of bits in the high limit.

5. The current bit(s) are greater than the high limit. In this case, the high child node of the current node, and the high child node of each subsequent node, is followed until a leaf node is reached. To follow the high child node, the reference to the child node stored in the current node is determined. A pointer may then be set to the location in memory, or to the location within a file, indicated by that reference. The process repeats until a leaf node is reached.

At operation 710, either the high child node or the low child node of the current node is followed depending on the value of the bit currently being evaluated.

If the value of the bit currently being evaluated is one, the high child node is followed. To follow the high child node, the reference to the child node stored in the current node is determined. A pointer may then be set to the location in memory, or to the location within a file, indicated by that reference. The value stored in that address or location is used when performing the next iteration of operation 714 and/or 706.

If the value of the bit currently being evaluated is zero, the low child node is followed. To follow the low child node, a pointer may be set to the location in memory, or to the location within a file, adjacent to the current node. The value stored in that address or location is used when performing the next iteration of operation 714 and/or 706.

At operation 712, the next most significant bit of the query is read. For example, a bit mask previously applied to the query may be shifted by one bit to isolate the next most significant bit of the query.

Operation 714 comprises determining whether a leaf node was reached at operation 708 or 710. To determine whether a leaf node was reached, the value stored in the node is evaluated to determine whether it contains a result (or a reference to a result). For the example data structure 2 illustrated in Table 5, bits zero to three of the stored value are evaluated to determine whether they represent a value that is less than the number of elements in the data structure 2. If bits zero to three represent a value that is greater than or equal to the number of elements in the data structure, a leaf node was reached. Alternatively, if bits zero to three represent a value that is less than the number of elements in the data structure, a leaf node was not reached. If a leaf node was reached, the method 700 proceeds to operation 716. If a leaf node was not reached, the method 700 returns to operation 706 for another iteration.

At operation 716, a result is retrieved from the leaf node. More specifically, the number of elements in the data structure 2 is subtracted from the value stored in the leaf node, yielding a result or a reference to a result. If this yields a reference to a result, the result is obtained from the data structure in which it is stored. For example, to retrieve a result from leaf node 65 of Table 5, a reference to the result is decoded by subtracting the number of elements (nine) from the value represented by bits zero to three (1100 in binary, which is equal to twelve in decimal), giving a value of three; this is a reference to result index "3" in Table 3. Thus, a result of "United States of America" is retrieved from Table 3.

At operation 718, the result retrieved at operation 716 is returned. The result may be returned to the entity from which the query was received at operation 702. For example, the result may be returned to another process being executed on the computing device on which the data structure 2 is stored, or the result may be returned to a different computing device via a communication network. The method 700 is then complete.

To illustrate the method 700 of retrieving a result, consider an example in which the data structure 2 has the form and contents shown in Table 5 (as illustrated in FIG. 4), the spans are stored in the span look-up table of Table 4, the results are stored in Table 3, and the query is "101100". In this example, the query is identical to an entry in the data structure 2, i.e., the entry with leaf node 55. At operation 704, the most significant bit of the query ("1") is read. At the first iteration of operation 706, the root node 20 is found to include a span with an index of "0". The method proceeds to operation 708, at which the current bit of the query is found to be equal to the high limit of the span; the high child node is followed, and node 50 is the next node to be evaluated. The next most significant bit of the query ("0") is read for the next iteration. At the first iteration of operation 714, it is determined that a leaf node has not been reached. The method returns to operation 706 for another iteration.

At the second iteration of operation 706, node 50 is found to include a span with an index of "2". The method proceeds to operation 708, at which the current bit of the query ("0") and the next two bits of the query ("11") are found to be equal to the low limit of the span ("011"); the low child node is followed, and node 53 is the next node to be evaluated. The next most significant bit of the query ("0") after the span is read for the next iteration. At the second iteration of operation 714, it is determined that a leaf node has not been reached. The method returns to operation 706 for another iteration.

At the third iteration of operation 706, node 53 is found to include a span with an index of "3". The method proceeds to operation 708, at which the current bit of the query ("0") and the next bit of the query ("0") are found to be equal to the low limit of the span ("00"); the low child node is followed, and leaf node 55 is the next node to be evaluated. At the third iteration of operation 714, it is determined that a leaf node has been reached. The method proceeds to operation 716, at which the number of elements (nine) is subtracted from the value represented by bits zero to three ("1011" in binary, which is equal to eleven in decimal), giving a value of two; this is a reference to result index "2" in Table 3. Thus, a result of "Camden, London, United Kingdom" is retrieved from Table 3. This result is then returned at operation 718 to the process or computing device from which the query was received.

Now consider another example using the same data structure 2, spans and results, but in which the query is "000010". Unlike the previous example, this query is not identical to an entry in the data structure 2. Instead, the query is between two entries, i.e., entry "000000" with leaf node 35 and entry "010110" with leaf node 45. At operation 704, the most significant bit of the query ("0") is read. At the first iteration of operation 706, the root node 20 is found to include a span with an index of "0". The method proceeds to operation 708, at which the current bit of the query is found to be equal to the low limit of the span; the low child node is followed, and node 30 is the next node to be evaluated. The next most significant bit of the query ("0") is read for the next iteration. At the first iteration of operation 714, it is determined that a leaf node has not been reached. The method returns to operation 706 for another iteration.

At the second iteration of operation 706, node 30 is found to include a span with an index of "1". The method proceeds to operation 708, at which the current bit of the query ("0") and the next four bits of the query ("0010") are found to be greater than the low limit of the span ("00000") but lower than the high limit of the span ("10110"). The low child node is followed, and leaf node 35 is reached. At the third iteration of operation 714, it is determined that a leaf node has been reached. The method proceeds to operation 716, at which the number of elements (nine) is subtracted from the value represented by bits zero to three ("1001" in binary, which is equal to nine in decimal), giving a value of zero; this is a reference to result index "0" in Table 3. Thus, a result of "United Kingdom" is retrieved from Table 3. This result is then returned at operation 718 to the process or computing device from which the query was received.

This example illustrates an advantageous property of the data structure 2 and the method 700 of retrieving a result from the data structure. Specifically, a result can be retrieved even when the query is not identical to an entry stored in the data structure 2. This property reduces the size of the data structure 2 by avoiding the need to store multiple entries that are associated with the same result.

For example, assume that the data to be stored in the data structure 2 was a range of twenty-two consecutive values between "000000" and "010101", each of which is associated with the result "A". There would be no need to store twenty-two separate entries in the data structure 2. Instead, only the first value in that range ("000000") would need to be stored. This is because any query in that range would give the result "A", as illustrated by the example above in which the query was "000010". The storage of twenty-one redundant in the data structure 2 can thus be avoided.

Redundant entries associated with the same result can be identified at operation 304, and omitted when outputting the data structure at operation 208. This can lead to a significant reduction in the size of the data structure 2.

Applications of the Data Structure

In general, data that is well-suited to being stored in the data structure 2 maps each of a plurality of values of a first variable to a respective value of a second variable. The values of the first variable are stored as entries in the data structure 2, and the respective values of the second value are stored as results in data structure 2. There can be a one-to-one or many-to-one mapping between entries and results. A one-to-one many mapping, whereby one entry maps to multiple results, is not permitted.

Advantageously, the first variable has one or more ranges of possible values, where all values in each range map to a single value of the second variable. Data of this nature can harness the above-mentioned advantageous property of allowing a result to be retrieved even when the query is not identical to an entry stored in the data structure 2.

Such data can be stored efficiently in the data structure 2 by storing only the start of each range of values, rather than storing multiple discrete values within the range.

A few non-limiting examples of data that is particularly well-suited to being stored in the data structure 2 will now be described.

1. Internet Protocol (IP) addresses The data structure 2 can be used to store ranges of IPV4 or IPv6 addresses and/or individual IPv4 or IPv6 addresses. Each address or range of addresses can be associated with a result such as, but not limited to, a real-world geographic location, a destination IP address, the operator of the IP address, or an indication of whether to grant or deny a service to that IP address.

Most existing solutions for Internet geolocation store IP addresses in either an ordered list or an ordinary binary tree (i.e., a binary tree in which each node contains a reference to each of its child node). The data structure 2 disclosed herein requires less space than an ordered list or an ordinary binary tree to store the same data. The data structure 2 is small enough to store all currently-allocated IPv4 addresses in the random access memory typically allocated to a process by a server computing device (such as, but not limited to, an Amazon Elastic Compute Cloud ("EC2") process). Furthermore, the data structure is scalable to the far larger number of addresses in IPv6.

IP addresses are stored in the data structure 2 in substantially the same way as the examples described above with reference to FIGS. 1 to 7. However, when storing IP addresses, each entry is a 32-bit number (in the case of IPV4) or a 128-bit number (in the case of IPV6), rather than a 6-bit number as used in those examples.

2. Media Access Control (MAC) addresses MAC addresses are unique 48-bit numbers that are assigned to networked computing devices. MAC addresses are stored in the data structure 2 in substantially the same way as the examples described above with reference to FIGS. 1 to 7, except each entry is a 48-bit number rather than a 6-bit number as used in those examples. Each MAC address (or range of MAC addresses) can be associated with a result such as, but not limited to: a real-world geographic location; an indication of whether to grant or deny a service; and/or information about the hardware, firmware and/or software of the computing device with that MAC address.

3. Geographic coordinates A geographic coordinate comprises a latitude value and a longitude value. Two such coordinates can be used to represent a rectangular geographic area, or part of a larger geographic area. For example, a first coordinate can specify the north-west corner of the rectangular area, and a second coordinate can specify the south-east corner. Alternatively, the first coordinate could specify the south-west corner of the rectangular area, and the second coordinate could specify the north-east corner.

The data structure 2 can be used to map coordinates to their real-world locations. For example, each entry in the data structure can comprise a coordinate in the form of a latitude value concatenated with a longitude value. Each such entry can be associated with a text string that describes the real-world location of that coordinate. Furthermore, two such entries can define the corners of a rectangle, such that a query comprising any coordinate within the rectangle will return the real-world location of the coordinate. When multiple non-overlapping rectangles are used to represent an area, a first coordinate can be stored as an entry in the data structure to define the start of a first rectangle, and a second can be stored to define the end of the first rectangle and the start of a second, adjacent rectangle.

For example, a rectangle that represents the whole of the Isle of Wight would have a north-west coordinate of approximately (50.7, −1.9) and a south-east coordinate of (50.6, −1.2). To store the coordinates in the data structure 2, they are first modified so that they are positive integers and can be compared bit for bit. This this can be achieved by adding 90 to the latitudes and subtracting 180 from the longitudes. Thus coordinates (50.7, −1.9) and (50.6, −1.2) become values "140.7", "181.9", "140.6" and "181.2", respectively. The decimal component can be removed by multiplying each value by ten, giving values of "1407", "1819", "1406" and "1812". Each of the decimal values is converted to a 12-bit binary number. Each binary latitude value is concatenated with its respective binary longitude value to give two 24-bit values, which are stored as respective entries in the data structure 2. Specifically, the decimal value "14061812" would be stored as a binary entry "0101 0111 1110 0111 0001 0100", whilst the decimal value "14071819" would be stored as a binary entry "0101 0111 1111 0111 0001 1011". Both entries are associated with the result "Isle of Wight, United Kingdom". To retrieve a result from the data structure, a coordinate is converted to a 24-bit value in the same manner. Any query between "0101 0111 1110 0111 0001 0100" and "0101 0111 1111 0111 0001 1011" would return the result "Isle of Wight, United Kingdom".

In this simple example, a geographical area is represented using a single rectangle defined by two coordinates. In more complicated examples, a geographical area could be represented using a greater number of smaller rectangles in order to follow the real-world boundary of the geographical area. Using a greater number of rectangles also allows greater granularity, whereas using fewer rectangles provides more coarse results.

4. Genome coordinates A genome coordinate specifies the location of a particular sequence within a genome. A genome coordinate typically comprises: a chromosome where the sequence is located; a start position, which specifies the start of the sequence on the chromosome; and an end position, which specifies the end of the sequence on the chromosome. A genome coordinate (or a range of genome coordinates) can be converted to an equivalent binary value and stored in the data structure 2 in substantially the same way as the examples described above with reference to FIGS. 1 to 7.

5. Issuer Identification Numbers (IIN) The first six or eight digits of a payment card (such as a credit or debit card) are known as an IIN or a Bank Identification Number (BIN). IINs can be converted to an equivalent binary value and stored in the data structure 2 in substantially the same way as the examples described above with reference to FIGS. 1 to 7. Each IIN (or range of IINs) can be associated with a result such as, but not limited to: the name of the payment card issuer; the country in which the payment card was issued; and/or a reputation rating.

6. Vehicle Identification Numbers (VIN) All modern vehicles are assigned a unique VIN. ISO 3779 defines a 17-character alphanumeric format for VINs. VINs can be converted to an equivalent binary value and stored in the data structure 2 in substantially the same way as the examples described above with reference to FIGS. 1 to 7. Each VIN (or range of VINs) can be associated with a result such as, but not limited to: the identity of the manufacturer; characteristics of the vehicle (e.g., engine size, dimensions, fuel type); and/or the status of the vehicle (e.g., written-off or stolen).

Hardware Implementation

Figure 8:
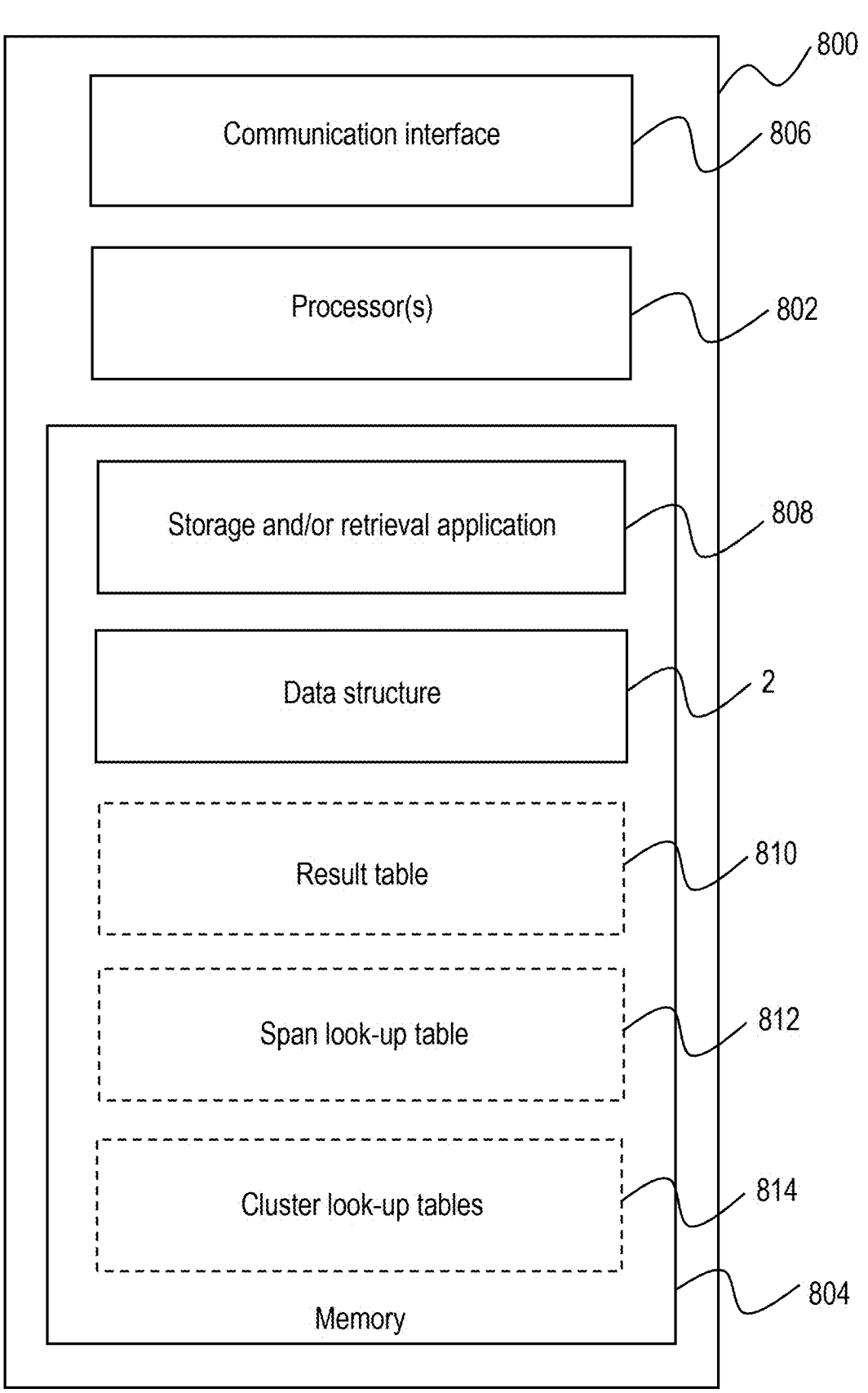
FIG. 8 is a schematic diagram of a computing device which can perform the methods shown in FIGS. 2, 3, 6 and 7.

FIG. 8 is a schematic diagram of an example of a computing device 800 suitable for implementing the methods shown in FIGS. 2, 3, 6 and 7. The computing device 800 may be a server (such as a web server), a computer forming part of a cloud computing environment, or a network router for example.

The computing device 800 comprises one or more processors 802, a memory 804 and a communication interface 806. The one or more processors 802 can include any suitable type of data processing device, such as a microprocessor. The memory 804 can include a volatile memory, a non-volatile memory, or both volatile and non-volatile memories. The memory 804 stores the data structure 2 disclosed above and an application 808. The application 808 includes processor-executable instructions that, when executed by the one or more processors 802, cause the computing device 802 to perform any or all of the methods described above with reference to FIGS. 2, 3, 6 and 7. The memory 804 optionally stores a result table 810 in implementations where the results are not stored in the data structure 2 itself. Table 3 (above) is an example of a result table 810. The memory 804 optionally stores a span look-up table 812 when operation 302 was performed when creating the data structure 2. Table 4 (above) is an example of a span look-up table 812. The memory 804 optionally stores a plurality of cluster look-up tables 814 when clustering was performed during operation 302 when creating the data structure 2. When the application 808 is executed, the whole of the data structure 2 may be loaded into a random access memory (RAM) portion of the memory 804. The whole of the span look-up table 812 and/or cluster look-up tables 814 may be loaded into the RAM. The results 810 associated with IP addresses may optionally be loaded into the RAM.

The communication interface 806 can include any suitable type of hardware and/or software that enables the computing device 800 to communicate with another computer (not shown). The computing device 800 may communicate with the other computer via a network (not shown). The network may include any type of wired and/or wireless data network, and may include the Internet. The computing device 800 may receive a request from the other computer via the communication interface 806. The request may be a request to look up a result in the data structure 2, in which case the request includes a query as described above. The computing device 800 may respond to such a request by returning a result corresponding to the query.

Test Results

To prove the space-efficiency of the data structure 2 disclosed herein, the method 200 was used to store a corpus of IPV4 addresses and their associated results in a first data structure, to store a corpus of IPV6 addresses and their associated results in a second data structure, and to store both corpuses together in a third data structure. Operation 206 was performed while carrying out the method 200, including both of its constituent operations 302 and 304. Clustering was also performed. The size of each data structure was compared with an ordered list comprising the respective corpus of IP addresses and their associated results. The sizes of the ordered list and the novel data structure disclosed herein are given in Table 6.

TABLE 6

| Corpus | Size of list (bytes) | Size of novel data structure (bytes) | Size reduction (%) |
|---|---|---|---|
| IPv4 only | 45,404,645 | 37,170,131 | 18 |
| IPv6 only | 12,784,740 | 3,534,036 | 72 |
| IPv4 and IPV6 | 58,448,535 | 42,456,182 | 27 |

These tests show that the data structure 2 disclosed herein is significantly more space-efficient than an ordered list.

A space-efficient data structure 2, together with a method 200 of creating such a data structure and a method 700 of retrieving a result from such a data structure, has thus been disclosed. It will be understood that the invention has been described above purely by way of example, and that modifications of detail can be made within the scope of the claims. In particular, the sequence of operations shown in FIGS. 2, 3, 6 and 7 is merely exemplary. Any of the operations of methods 200 and 700 may be performed in a different order that achieves substantially the same result.

The invention claimed is:

1. A non-transitory computer-readable medium comprising a data structure stored thereon, the data structure storing a plurality of entries, each entry being a binary sequence comprising a plurality of bits each having a respective position and value, the data structure comprising an array having a plurality of elements including at least a first element, a second element and a third element, wherein:

the first element represents a first bit of a first entry and a first bit of a second entry, wherein the first bit of the first entry is at the same position as, but has a different value from, the first bit of the second entry, and wherein the first element stores a reference to only the second element;

the second element represents a second bit of the first entry, the second bit of the first entry having a position next to the first bit of the first entry; and the third element represents a second bit of the second entry, the second bit of the second entry having a position next to the first bit of the second entry, wherein the third element is stored adjacent to the first element in the array.

2. The non-transitory computer-readable medium of claim 1, wherein the second element represents one or more least significant bits of the first entry and stores a value that encodes data associated with the first entry, wherein the value is equal to the sum of the data and the number of elements in the array.

3. The non-transitory computer-readable medium of claim 1, wherein the third element represents one or more least significant bits of the second entry and stores a value that encodes data associated with the second entry, wherein the value is equal to the sum of the data and the number of elements in the array.

4. The non-transitory computer-readable medium of claim 1, wherein the first element stores the reference to the second element as a value that is less than the number of elements in the array.

5. The non-transitory computer-readable medium of claim 1, wherein the first element, second element and/or third element stores a reference to one or more sequences of consecutive bits represented by the first element, second element and/or third element, respectively.

6. The non-transitory computer-readable medium of claim 5, wherein the one or more sequences of consecutive bits represented by one of the first element, second element or third element comprise:

a first sequence of consecutive bits representing a lower limit of a range; and a second sequence of consecutive bits representing a higher limit of the range.

7. The non-transitory computer-readable medium of claim 6, wherein the second sequence of consecutive bits further represents a lower limit of another range.

8. The non-transitory computer-readable medium of claim 6, wherein the reference to one or more sequences of consecutive bits represented by the one of the first element, second element or third element comprises a reference to a row of a look-up table, wherein the row of the look-up table comprises:

a first column comprising the first sequence of consecutive bits; and a second column comprising the second sequence of consecutive bits.

9. The non-transitory computer-readable medium of claim 1, wherein each entry is an IP address.

10. The non-transitory computer-readable medium of claim 9, wherein the second element represents one or more least significant bits of the first entry and stores a value that encodes data associated with the first entry, wherein the data associated with the first entry identifies a geographic location associated with the IP address.

11. A method of creating a data structure, the data structure storing a plurality of entries, each entry being a binary sequence comprising a plurality of bits each having a respective position and value, the data structure comprising an array having a plurality of elements including at least a first element, a second element and a third element, wherein:

the first element represents a first bit of a first entry and a first bit of a second entry, wherein the first bit of the first entry is at the same position as, but has a different value from, the first bit of the second entry, and wherein the first element stores a reference to only the second element;

the second element represents a second bit of the first entry, the second bit of the first entry having a position next to the first bit of the first entry; and the third element represents a second bit of the second entry, the second bit of the second entry having a position next to the first bit of the second entry, wherein the third element is stored adjacent to the first element in the array, the method comprising:

creating the first element at a first location;

creating the second element at a second location;

creating the third element at a third location, the third location being adjacent to the first location; and storing a reference to the second location in the first element.

12. The method of claim 11, wherein the third location is at a known offset from the first location, and the method further comprises:

determining the known offset based on the minimum number of bits needed to store each element.

13. The method of claim 11, the method further comprising:

adding a plurality of entries including the first, second and third entries to a tree;

compressing the tree; and outputting the tree in the form of the data structure.

14. The method of claim 13, compressing the tree comprises:

identifying a plurality of nodes in the tree that each have a single child node, the plurality of nodes being next to one another on a path from a root node of the tree to a leaf node of the tree; and consolidating the plurality of nodes into a single node.

15. The method of claim 14, wherein consolidating the plurality of nodes into a single node comprises:

storing data in a row of a look-up table, wherein the row of the look-up table comprises a first column comprising a first sequence of consecutive bits in one of the first, second or third entries, and a second column comprising a second sequence of consecutive bits in another of the plurality of entries; and replacing the plurality of nodes with a single node, wherein the single node includes a reference to the row of the look-up table.

16. The method of claim 13, wherein:

compressing the tree comprises identifying a duplicated subtree in the tree; and outputting the tree in the form of the data structure comprises including only one instance of the duplicated subtree in the data structure.

17. A non-transitory computer-readable medium comprising instructions which, when executed by a computer, cause the computer to perform the method of claim 11.

* * * * *